United States Patent
Ely

(10) Patent No.: US 7,907,130 B2
(45) Date of Patent: Mar. 15, 2011

(54) SIGNAL TRANSFER METHOD AND APPARATUS

(75) Inventor: David Thomas Eliot Ely, Waterbeach (GB)

(73) Assignee: Synaptics (UK) Limited, Cambridge (GB)

( * ) Notice: Subject to any disclaimer, the term of this patent is extended or adjusted under 35 U.S.C. 154(b) by 1066 days.

(21) Appl. No.: 10/516,265

(22) PCT Filed: Jun. 5, 2003

(86) PCT No.: PCT/GB03/02432
§ 371 (c)(1),
(2), (4) Date: Nov. 30, 2004

(87) PCT Pub. No.: WO03/105072
PCT Pub. Date: Dec. 18, 2003

(65) Prior Publication Data
US 2005/0174259 A1      Aug. 11, 2005

(30) Foreign Application Priority Data

Jun. 5, 2002  (GB) .................................. 0212889.0
Jan. 31, 2003  (GB) .................................. 0302298.5

(51) Int. Cl.
   *G06F 3/033* (2006.01)
   *G06F 3/046* (2006.01)
(52) U.S. Cl. .................................. 345/179; 178/18.07
(58) Field of Classification Search .......... 345/173–179; 178/18.01–18.07, 19.03
See application file for complete search history.

(56) References Cited

U.S. PATENT DOCUMENTS

| | | |
|---|---|---|
| 2,145,742 A | 1/1939 | Wechsung |
| 2,867,783 A | 1/1959 | Childs |
| 2,942,212 A | 6/1960 | Mynall |
| 3,219,956 A | 11/1965 | Newell et al. |
| 3,297,940 A | 1/1967 | Mulligan et al. |
| 3,482,242 A | 12/1969 | Hargrove |
| 3,647,963 A | 3/1972 | Bailey |
| 3,772,587 A | 11/1973 | Ferrand et al. |
| 3,812,481 A | 5/1974 | Stednitz |
| 3,851,242 A | 11/1974 | Ellis |
| 3,873,770 A | 3/1975 | Ioannou |
| 3,895,356 A | 7/1975 | Kraus |

(Continued)

FOREIGN PATENT DOCUMENTS

DE          1134848         8/1962

(Continued)

OTHER PUBLICATIONS

Patent Abstracts of Japan, vol. 010. No. 009, (P-420), Jan. 14, 1986 & JP 60 165512 A (Toshiba KK), Aug. 28, 1985.

(Continued)

*Primary Examiner* — Kevin M Nguyen
(74) *Attorney, Agent, or Firm* — Nixon & Vanderhye PC

(57) ABSTRACT

An x-y digitising system is described which operates with a resonant stylus. The x-y digitising system includes an excitation winding for energising the resonant stylus and a number of sensor windings for receiving a signal re-radiated by the resonant stylus when energised. At least one of the excitation winding and the sensor winding is arranged to have its effective magnetic axis non-othogonal to the working area of the x-y digitising system. With this arrangement, improved energy transfer between the x-y digitising system and the resonant stylus can be achieved and/or improved position measurement accuracy can be obtained.

30 Claims, 24 Drawing Sheets

U.S. PATENT DOCUMENTS

| | | | |
|---|---|---|---|
| 3,898,635 A | 8/1975 | Kulterman | |
| 3,906,436 A | 9/1975 | Kurauchi et al. | |
| 3,962,663 A | 6/1976 | Visser | |
| 4,005,396 A | 1/1977 | Fujiwara et al. | |
| 4,014,015 A | 3/1977 | Gundlach | |
| 4,065,850 A | 1/1978 | Burr et al. | |
| 4,081,603 A | 3/1978 | Davis et al. | |
| 4,092,852 A | 6/1978 | Fowler et al. | |
| 4,094,572 A | 6/1978 | Burr et al. | |
| 4,097,684 A | 6/1978 | Burr | |
| 4,150,352 A | 4/1979 | Pomella et al. | |
| 4,156,192 A | 5/1979 | Schedrovitsky et al. | |
| 4,210,775 A | 7/1980 | Rodgers et al. | |
| 4,223,300 A | 9/1980 | Wiklund | |
| 4,255,617 A | 3/1981 | Carau, Sr. et al. | |
| 4,341,385 A | 7/1982 | Doyle et al. | |
| 4,358,723 A | 11/1982 | Scholl et al. | |
| 4,387,509 A * | 6/1983 | Dechelette | 29/850 |
| 4,423,286 A | 12/1983 | Bergeron | |
| 4,425,511 A * | 1/1984 | Brosh | 307/106 |
| 4,482,784 A | 11/1984 | Whetstone | |
| 4,504,832 A | 3/1985 | Conte | |
| 4,507,638 A | 3/1985 | Brosh | |
| 4,532,376 A | 7/1985 | Rockwell | |
| 4,577,057 A | 3/1986 | Blesser | |
| 4,577,058 A | 3/1986 | Collins | |
| 4,593,245 A | 6/1986 | Vierti et al. | |
| 4,609,776 A | 9/1986 | Murakami et al. | |
| 4,642,321 A | 2/1987 | Schoenberg et al. | |
| 4,672,154 A * | 6/1987 | Rodgers et al. | 178/19.07 |
| 4,686,501 A | 8/1987 | Sing et al. | |
| 4,693,778 A | 9/1987 | Swiggett et al. | |
| 4,697,050 A | 9/1987 | Farel et al. | |
| 4,697,144 A | 9/1987 | Howbrook | |
| 4,697,244 A | 9/1987 | Murakami et al. | |
| 4,704,501 A | 11/1987 | Taguchi et al. | |
| 4,709,209 A | 11/1987 | Murakami et al. | |
| 4,711,026 A | 12/1987 | Swiggett et al. | |
| 4,711,977 A | 12/1987 | Miyamori et al. | |
| 4,723,446 A | 2/1988 | Saito et al. | |
| 4,734,546 A | 3/1988 | Landmeier | |
| 4,737,698 A | 4/1988 | McMullin et al. | |
| 4,748,295 A | 5/1988 | Rogers | |
| 4,752,655 A | 6/1988 | Tajiri et al. | |
| 4,786,765 A | 11/1988 | Yamanami et al. | |
| 4,820,961 A | 4/1989 | McMullin | |
| 4,821,002 A | 4/1989 | Luly | |
| 4,832,144 A * | 5/1989 | Murakami et al. | 178/18.07 |
| 4,848,496 A | 7/1989 | Murakami et al. | |
| 4,868,443 A | 9/1989 | Rossi | |
| 4,878,553 A | 11/1989 | Yamanami et al. | |
| 4,891,590 A | 1/1990 | Hammel et al. | |
| 4,893,077 A | 1/1990 | Auchterlonie | |
| 4,902,858 A | 2/1990 | Yamanami et al. | |
| 4,963,703 A | 10/1990 | Phillips | |
| 4,975,546 A | 12/1990 | Craig | |
| 4,985,691 A | 1/1991 | Pulyer et al. | |
| 4,988,837 A | 1/1991 | Murakami et al. | |
| 4,999,461 A | 3/1991 | Murakami et al. | |
| 5,004,872 A | 4/1991 | Lasley | |
| 5,013,047 A | 5/1991 | Schwab | |
| 5,023,408 A | 6/1991 | Murakami et al. | |
| 5,028,745 A | 7/1991 | Yamanami et al. | |
| 5,041,785 A | 8/1991 | Bogaerts et al. | |
| 5,045,645 A | 9/1991 | Hoendervoogt et al. | |
| 5,059,180 A | 10/1991 | McLees | |
| 5,066,833 A | 11/1991 | Zalenski | |
| 5,082,286 A | 1/1992 | Ryan et al. | |
| 5,088,928 A | 2/1992 | Chan | |
| 5,122,623 A | 6/1992 | Zank et al. | |
| 5,129,654 A | 7/1992 | Bogner | |
| 5,134,388 A | 7/1992 | Murakami et al. | |
| 5,134,689 A | 7/1992 | Murakami et al. | |
| 5,136,125 A * | 8/1992 | Russell | 178/18.07 |
| 5,177,389 A | 1/1993 | Schalk | |
| 5,188,368 A | 2/1993 | Ryan | |
| 5,206,785 A | 4/1993 | Hukashima | |
| 5,218,174 A | 6/1993 | Gray et al. | |
| 5,225,637 A | 7/1993 | Rodgers et al. | |
| 5,239,489 A | 8/1993 | Russell | |
| 5,245,336 A | 9/1993 | Chen et al. | |
| 5,247,137 A | 9/1993 | Epperson | |
| 5,247,138 A | 9/1993 | Landmeier | |
| 5,274,198 A * | 12/1993 | Landmeier | 178/18.08 |
| 5,298,689 A * | 3/1994 | Mohri et al. | 178/18.07 |
| 5,342,136 A | 8/1994 | Fukami | |
| 5,349,139 A | 9/1994 | Verrier et al. | |
| 5,357,062 A | 10/1994 | Rockwell et al. | |
| 5,369,227 A | 11/1994 | Stone | |
| 5,381,091 A | 1/1995 | Kobayashi et al. | |
| 5,396,443 A | 3/1995 | Mese et al. | |
| 5,406,155 A | 4/1995 | Persson | |
| 5,434,372 A | 7/1995 | Lin | |
| 5,461,204 A | 10/1995 | Makinwa et al. | |
| 5,486,731 A | 1/1996 | Masaki et al. | |
| 5,525,981 A | 6/1996 | Abernethy | |
| 5,554,827 A | 9/1996 | Oda | |
| 5,557,076 A | 9/1996 | Wieczorek et al. | |
| 5,571,997 A | 11/1996 | Gray et al. | |
| 5,600,105 A | 2/1997 | Fukuzaki et al. | |
| 5,619,431 A | 4/1997 | Oda | |
| 5,625,239 A | 4/1997 | Persson et al. | |
| 5,635,683 A | 6/1997 | McDermott et al. | |
| 5,646,496 A | 7/1997 | Woodland et al. | |
| 5,657,011 A | 8/1997 | Komatsu et al. | |
| 5,691,513 A * | 11/1997 | Yamamoto et al. | 178/18.07 |
| 5,691,748 A | 11/1997 | Fukuzaki | |
| 5,693,913 A | 12/1997 | Sudo et al. | |
| 5,693,993 A | 12/1997 | Ito et al. | |
| 5,748,110 A | 5/1998 | Sekizawa | |
| 5,751,229 A | 5/1998 | Funahashi | |
| 5,764,221 A * | 6/1998 | Willard | 345/173 |
| 5,783,940 A | 7/1998 | Kolomeitsev | |
| 5,815,091 A | 9/1998 | Dames | |
| 5,818,091 A | 10/1998 | Lee et al. | |
| 5,818,431 A | 10/1998 | Oh et al. | |
| 5,826,473 A | 10/1998 | Saka et al. | |
| 5,854,449 A | 12/1998 | Adkins | |
| 5,864,098 A | 1/1999 | Shinohe | |
| 5,866,847 A | 2/1999 | Saka et al. | |
| 5,895,895 A | 4/1999 | Ono et al. | |
| 5,914,735 A | 6/1999 | Yamamoto et al. | |
| 5,943,044 A | 8/1999 | Martinelli et al. | |
| 6,002,387 A | 12/1999 | Ronkka et al. | |
| 6,005,555 A | 12/1999 | Katsurahira et al. | |
| 6,124,708 A | 9/2000 | Dames | |
| 6,236,199 B1 | 5/2001 | Irle et al. | |
| 6,239,789 B1 | 5/2001 | Sekizawa et al. | |
| 6,249,135 B1 | 6/2001 | Maruyama et al. | |
| 6,249,234 B1 | 6/2001 | Ely et al. | |
| 6,249,235 B1 | 6/2001 | Iwasaki | |
| 6,255,810 B1 | 7/2001 | Irle et al. | |
| 6,262,684 B1 | 7/2001 | Stewart et al. | |
| 6,288,710 B1 | 9/2001 | Lee et al. | |
| 6,304,014 B1 | 10/2001 | England et al. | |
| 6,304,076 B1 | 10/2001 | Madni et al. | |
| 6,396,005 B2 * | 5/2002 | Rodgers et al. | 178/18.01 |
| 6,483,713 B2 * | 11/2002 | Samant et al. | 361/749 |
| 6,489,899 B1 | 12/2002 | Ely et al. | |
| 6,513,943 B2 | 2/2003 | Fukuyoshi | |
| 6,522,128 B1 | 2/2003 | Ely et al. | |
| 6,534,970 B1 | 3/2003 | Ely et al. | |
| 6,667,740 B2 | 12/2003 | Ely et al. | |
| 6,705,511 B1 | 3/2004 | Dames et al. | |
| 6,788,221 B1 | 9/2004 | Ely et al. | |
| 6,797,895 B2 | 9/2004 | Lapstun et al. | |
| 6,798,404 B2 | 9/2004 | Sharma | |
| 6,888,538 B2 | 5/2005 | Ely et al. | |
| 2001/0001430 A1 * | 5/2001 | Ely et al. | 178/18.03 |
| 2001/0006369 A1 | 7/2001 | Ely | |

FOREIGN PATENT DOCUMENTS

| | | |
|---|---|---|
| DE | 3500121 | 7/1986 |
| DE | 3620412 | 12/1987 |
| EP | 0159191 A2 | 10/1985 |
| EP | 0182085 A2 | 5/1986 |
| EP | 0182085 A3 | 5/1986 |

| | | | |
|---|---|---|---|
| EP | 0209513 A1 | 6/1986 |
| EP | 0218745 | 4/1987 |
| EP | 0 307 667 | 3/1989 |
| EP | 0313046 | 4/1989 |
| EP | 0 499 641 | 8/1992 |
| EP | 0 511 406 | 11/1992 |
| EP | 0537458 | 4/1993 |
| EP | 0552001 A1 | 7/1993 |
| EP | 0554900 | 8/1993 |
| EP | 0607694 A1 | 7/1994 |
| EP | 0657917 A1 | 6/1995 |
| EP | 0 672 997 | 9/1995 |
| EP | 0675581 A1 | 10/1995 |
| EP | 0680009 | 11/1995 |
| EP | 0680009 A2 | 11/1995 |
| EP | 0709648 A2 | 5/1996 |
| EP | 0716390 | 6/1996 |
| EP | 0743508 | 11/1996 |
| EP | 0772149 | 5/1997 |
| FR | 1325017 | 4/1963 |
| FR | 2298082 | 8/1976 |
| FR | 2682760 | 4/1993 |
| GB | 851543 | 10/1960 |
| GB | 1122763 | 8/1968 |
| GB | 1452132 | 10/1976 |
| GB | 2012431 A | 7/1979 |
| GB | 2021273 A | 11/1979 |
| GB | 2042183 A | 9/1980 |
| GB | 2059593 A | 4/1981 |
| GB | 2064125 A | 6/1981 |
| GB | 2074736 A | 11/1981 |
| GB | 1604824 | 12/1981 |
| GB | 2103943 A | 3/1983 |
| GB | 2141235 A | 12/1984 |
| JP | 63-211014 A | 9/1988 |
| JP | 02-248816 | 10/1990 |
| JP | 406051905 A | 2/1994 |
| TW | 287267 | 1/1996 |
| TW | 347542 | 11/1998 |
| WO | 99/34171 | 0/1999 |
| WO | 92/12401 | 7/1992 |
| WO | 94/25829 | 11/1994 |
| WO | 95/31696 | 11/1995 |
| WO | 96/03188 A1 | 2/1996 |
| WO | 97/14935 | 4/1997 |
| WO | 98/00921 | 1/1998 |
| WO | 98/54545 | 12/1998 |
| WO | 98/58237 A | 12/1998 |
| WO | 00/33244 A | 6/2000 |

OTHER PUBLICATIONS

Klatt, "Phase of Digital Data Fixes Shaft Angle", Electrical Design News, vol. 16, No. 12, Jun. 15, 1971, pp. 53-56. XP002045871.
Patent Abstracts of Japan, vol. 15, No. 37, (P-1159), Jan. 29, 1991 & JP 02 275314 A (Omron Tateisi Electron Co), Nov. 9, 1990.
Patent Abstracts of Japan, vol. 10, No. 32 (E-379), Feb. 7, 1986 & JP 60 189231 A (Matsushita Denki Sangyo KK), Sep. 26, 1985.
Pulle et al., "A New Magnetoresistive Based Sensor for Switched Reluctance Drives", Proceedings of the Annual Power Electronics Specialists Conference (PECS), Toledo, Jun. 29-Jul. 3, 1992, vol. 2, No. CONF. 23, Jun. 29, 1992, pp. 839-843, Institute of Electrical and Electronics Engineers.
Search Report for UK Application No. GB0416614.6 dated Oct. 22, 2004.
Search Report for PCT Application No. PCT/GB 99/03989 (published as WO 00/33244 A3) dated Aug. 23, 2000.
Search Report for PCT Application No. PCT/GB 03/02432 (published as WO 2003/105072 A3) dated May 11, 2004.
McDonnel, "The Use of Inductosyn to Digital Converters in Linear Control Systems", Automation, vol. 10, No. 11-12, Nov. 1975-Dec. 1975, pp. 31-32.
Electronics Letters, vol. 11, No. 1, Jan. 9, 1975. pp. 5-6, Gordon, "Digital xy Position Indicator Using Walsh Functions".
International Search Report for International Patent Application No. PCT/GB02/05247 dated May 23, 2005.
International Search Report for International Patent Application No. PCT/GB02/02387 dated Jan. 8, 2004.
British Examination Report for British Patent Application No. GB0422091.9 dated Jun. 1, 2005.
"Physics 2CL Lab Manual" Online! 1999, XP002327778, Retrieved from the Internet: URL:http://hep.ucsd.edu/dbmacf/1998-1999/2cl/manual/experiment3.pdf, Retrieved on May 11, 2005, pp. 51-61.

* cited by examiner

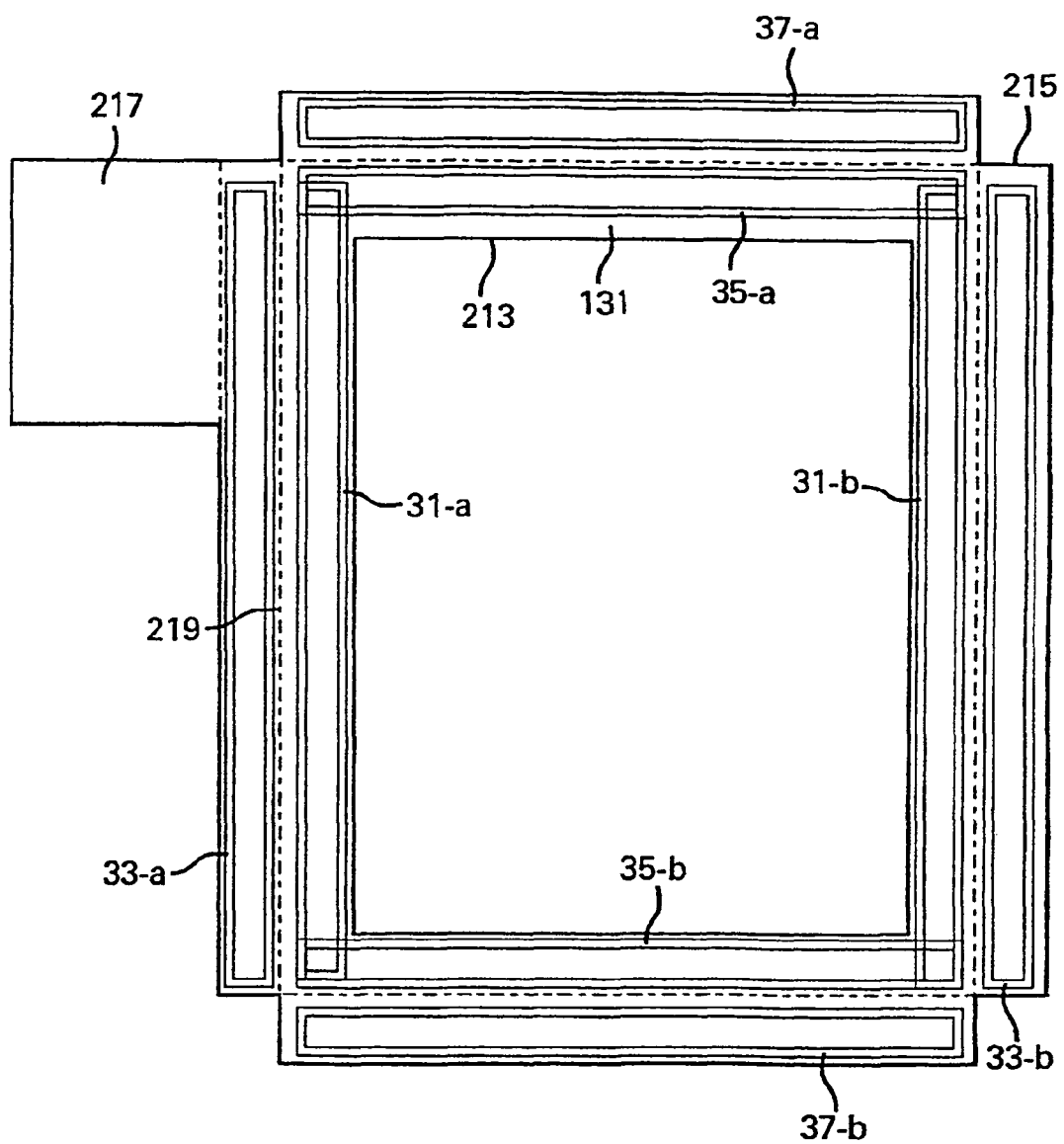

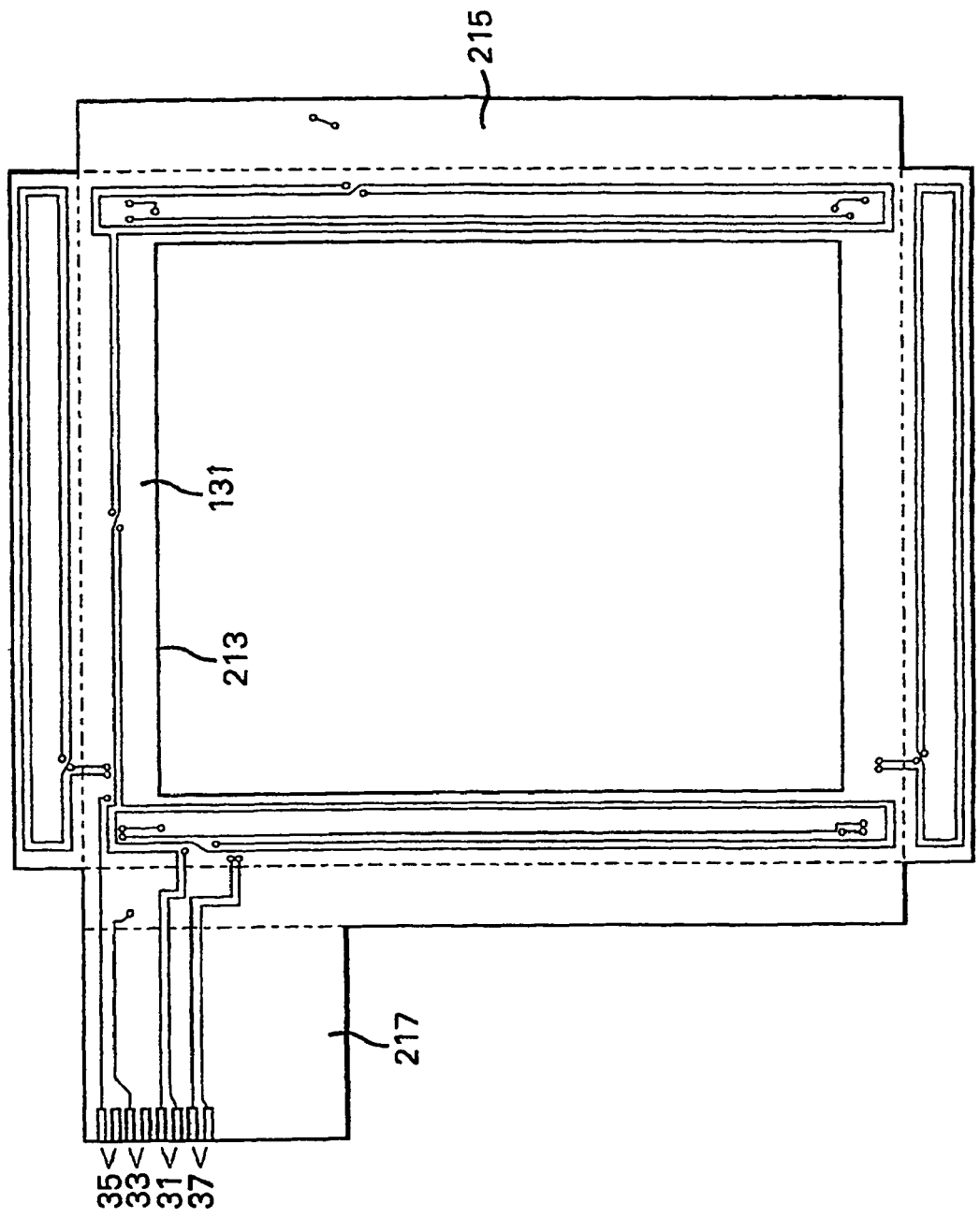

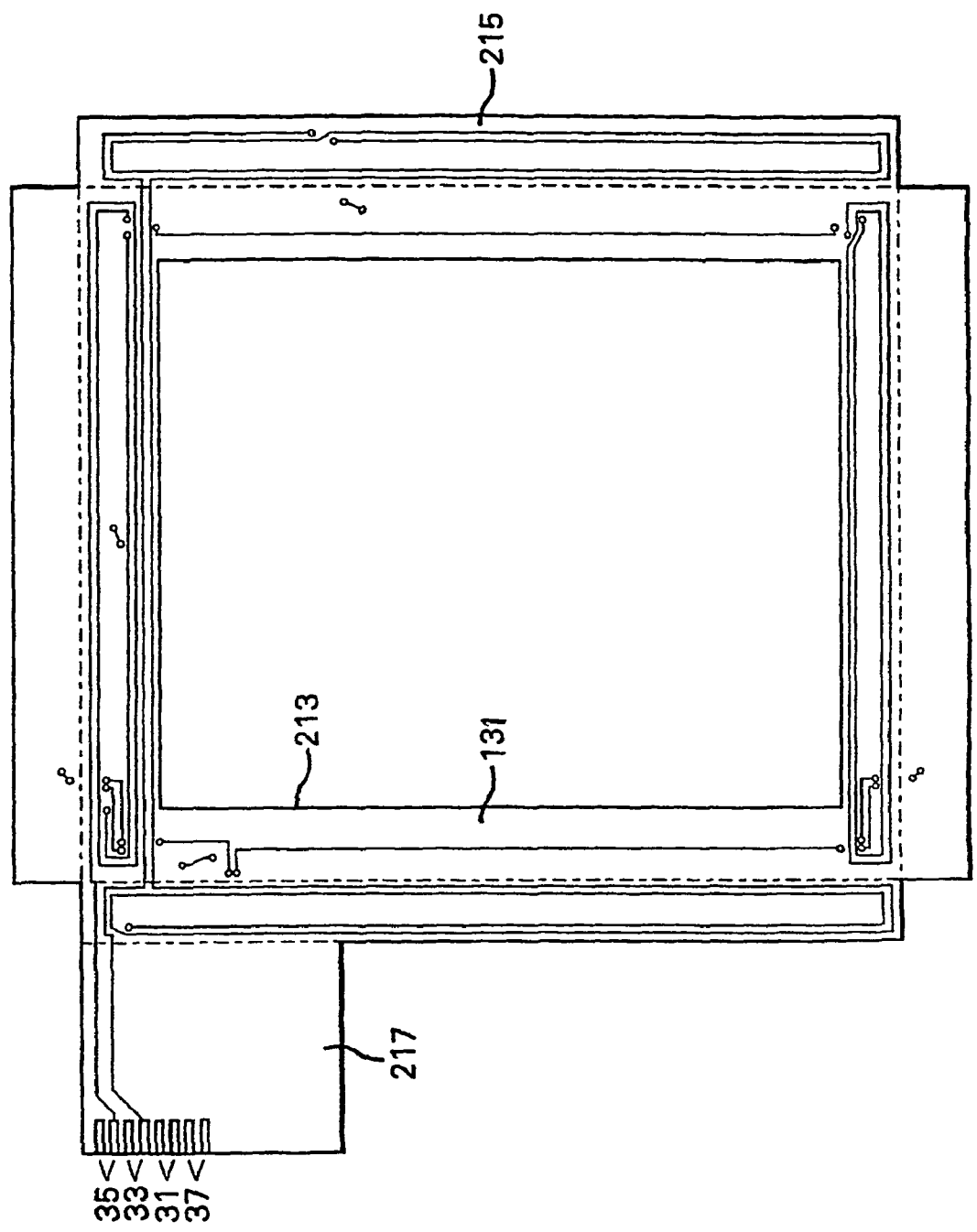

SIGNAL TRANSFER METHOD AND APPARATUS

CROSS-REFERENCE TO RELATED APPLICATIONS

This application is the U.S. national phase of international application PCT/GB03/02432 filed Jun. 5, 2003 which designated the U.S. and claims benefit of GB 0212889.0, dated Jun. 5, 2002 and GB 0302298.5, dated Jan. 31, 2003, the entire content of which is hereby incorporated by reference.

BACKGROUND

1. Technical Field

The present invention relates to an apparatus for and a method of transferring signals between two devices. The invention has particular application in portable, battery-powered devices such as personal digital assistants, mobile telephones, tablet PCs, web browsers, etc.

2. Related Art

Inductive digitiser systems used in portable computer devices work by transferring power to a moveable stylus inductively. When powered, the stylus in turn transmits a signal back to the digitiser tablet and this is detected by a number of detecting elements to determine the position and status of the stylus. The return signal power needs to be sufficiently high relative to noise sources to yield position and status information acceptably free from noise, such as position jitter. Additionally, it may also be desirable to power electronic circuitry in the stylus, which requires additional power. The digitiser tablet must therefore emit sufficient magnetic field to provide this power to the stylus. Where the power source is a battery, it is desirable to emit this magnetic field efficiently, using as small an amount of power from the battery as possible, within the constraints of cost and space.

There are a number of existing digitiser systems that inductively power a stylus. U.S. Pat. No. 4,878,553 discloses a system that powers the stylus using an array of loop coils or windings which are arrayed over an x and y direction. The system powers the stylus by passing current through those loop coils in closest proximity to the stylus. However, this arrangement is highly inefficient because there are a large number of loop coils, each of which is formed from a small number of conductor loops printed on a printed circuit board (PCB) and therefore the width of copper available for each loop coil can only be small. Additionally, the printed circuit board process itself limits conductor thickness to typically 0.05 mm, so that the overall volume of copper per loop is relatively small. As is well-known to those skilled in the art, such a small volume of copper results in the system being relatively inefficient at powering the stylus when it is above the coil.

WO 00/33244 describes another digitiser system for use in a personal digital assistant or a mobile telephone, where the stylus is powered by a single printed winding that is wound around the perimeter of the printed circuit board. In this system, a larger proportion of the printed circuit board area is devoted to this excitation winding, yielding greater copper mass and hence efficiency. However, the printed circuit board is usually installed behind a display with a metal bezel and a layer of magnetic screening material is provided to shield the digitiser signals from processing electronics beneath the printed circuit board. With this arrangement, eddy current losses in both the screening material and the bezel represent significant sources of power loss. Although the bezel may be slit to prevent such eddy current losses, this is undesirable due to a weakened display housing, the greater potential for electrostatic damage to the display and the need for customised display mechanics.

Another problem experienced by this type of stylus digitiser system is the tilting of the stylus by the user during use, which results in a position offset in the position measurement. Most current systems try to overcome this problem by using dedicated algorithms which process the signals from the loop coils or sensor coils to determine the tilt and hence the position offset error. However, these tilt correction algorithms rely on signals from conductors which are placed on either side of the actual position of the stylus and work well in the centre of the measurement area. However, when the stylus is positioned over an edge of the measurement area, the tilt correction algorithms become less accurate (because windings are only available to one side of the stylus) resulting in less accurate position measurements at the edge of the measurement area.

BRIEF SUMMARY

One aspect of the present invention provides an apparatus for transferring signals between first and second devices which alleviates one or more of the above problems.

According to this aspect, the present invention provides an apparatus having a planar working area and at least one winding whose effective magnetic axis is non-orthogonal to said planar working area. The winding may be used as an excitation coil to energise a remote electromagnetic device (such as a stylus) and/or it may be used to receive signals transmitted by the remote electromagnetic device.

According to another aspect, the present invention provides a position sensor having first and second relatively movable members, the first member having a plurality of windings arrayed over the x-y planar working area and each winding comprising at least two loops wound in opposite senses; the second member comprising an electromagnetic device operable to interact with the windings to generate signals that vary with the relative position of the first and second members; and wherein the loops of said plurality of windings are arranged in at least two rows and at least two columns with the loops in the same column being wound in the same sense and with adjacent loops in the same row being wound in alternative sense. Such windings may be used to either transmit signals to or to receive signals from the electromagnetic device.

According to a further aspect, the present invention provides a circuit board having at least two conductor loops one of which is provided in a central portion and the other of which is provided in a peripheral portion which is flexible relative to the central portion.

BRIEF DESCRIPTION OF THE DRAWINGS

Exemplary embodiments of the present invention will now be described with reference to the accompanying drawings in which:

FIG. 4c schematically illustrates a cross-section of the excitation windings and the printed circuit board shown in FIG. 4a;

FIG. 7a schematically illustrates the form of a folded printed circuit board carrying the four sensor windings illustrated in FIG. 2a;

FIG. 7b illustrates the outline of the flexible printed circuit board and the fold lines of the circuit board shown in FIG. 7a;

FIG. 7c schematically illustrates the arrangement of the four sensor windings on the flexible printed circuit board shown in FIG. 7b;

FIG. 7d shows the conductor tracks which are formed on one layer of the flexible printed circuit board together with the corresponding connection pads;

FIG. 7e illustrates the conductor tracks formed on a second layer of the flexible printed circuit board which, together with the tracks on the first layer, create the four sensor windings illustrated in FIG. 2a;

FIG. 11b illustrates the pattern of conductors forming two of the windings shown in FIG. 11a;

FIG. 11c illustrates the pattern of conductors forming the other two windings shown in FIG. 11a;

FIG. 15b schematically illustrates a preferred form of the system model shown in FIG. 15a.

DETAILED DESCRIPTION OF EXEMPLARY EMBODIMENTS

Overview of Digitising System

Figure 1:
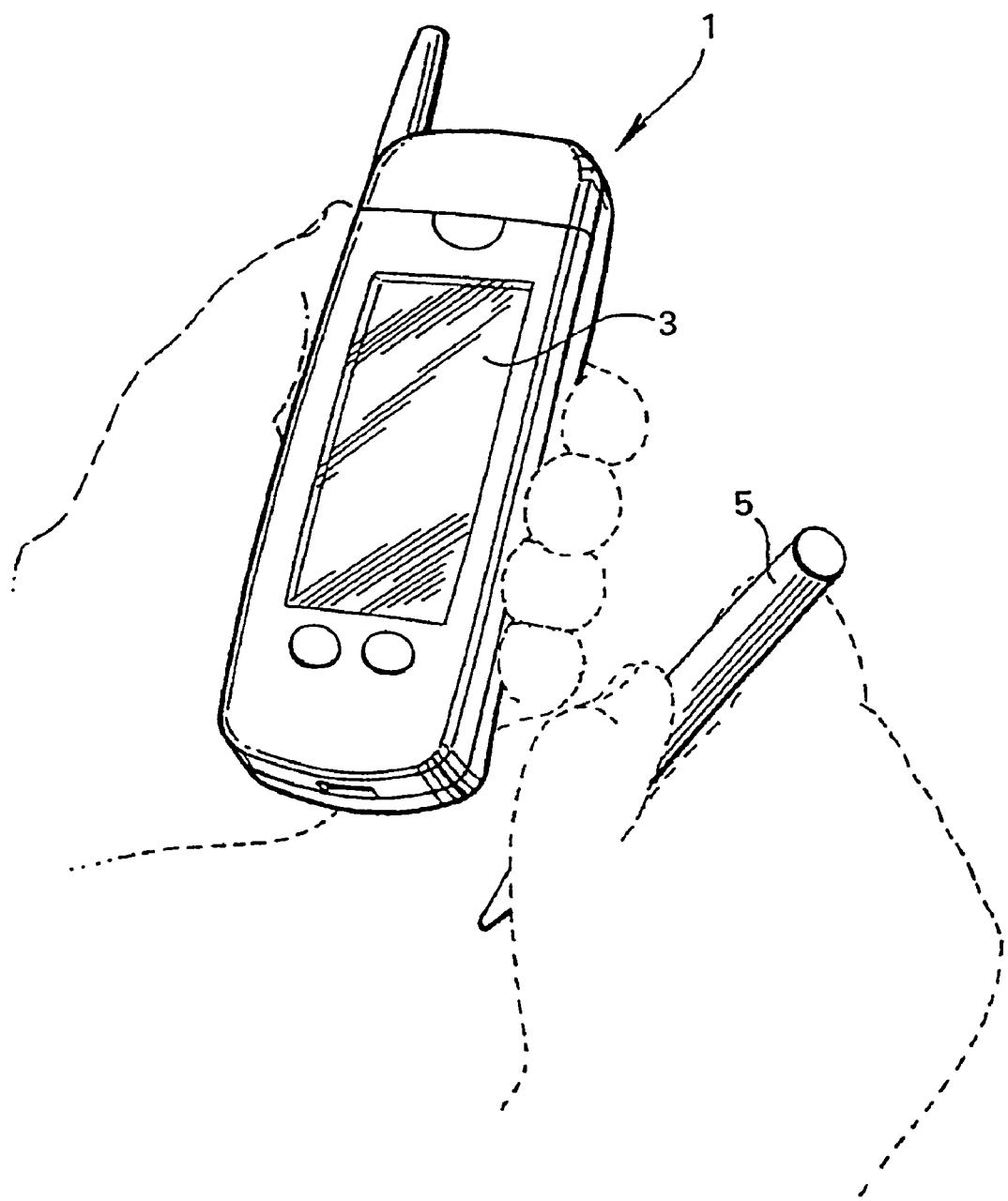
FIG. 1 is a perspective view showing a mobile telephone having a liquid crystal display and an x-y digitising system located behind the display which can sense the position and status of a resonant stylus.

FIG. 1 shows a handheld battery-powered mobile cellular telephone 1 which employs an x-y digitising system (not shown) that is associated with a liquid crystal display (LCD) 3 of the telephone 1. The x-y digitising system is operable to detect the presence and x-y position of a resonant stylus 5 relative to the LCD 3. The position of the signals output from the digitising system are used by the mobile telephone to control information that is displayed on the LCD 3 and to control the operating function of the telephone 1.

Figure 2A:
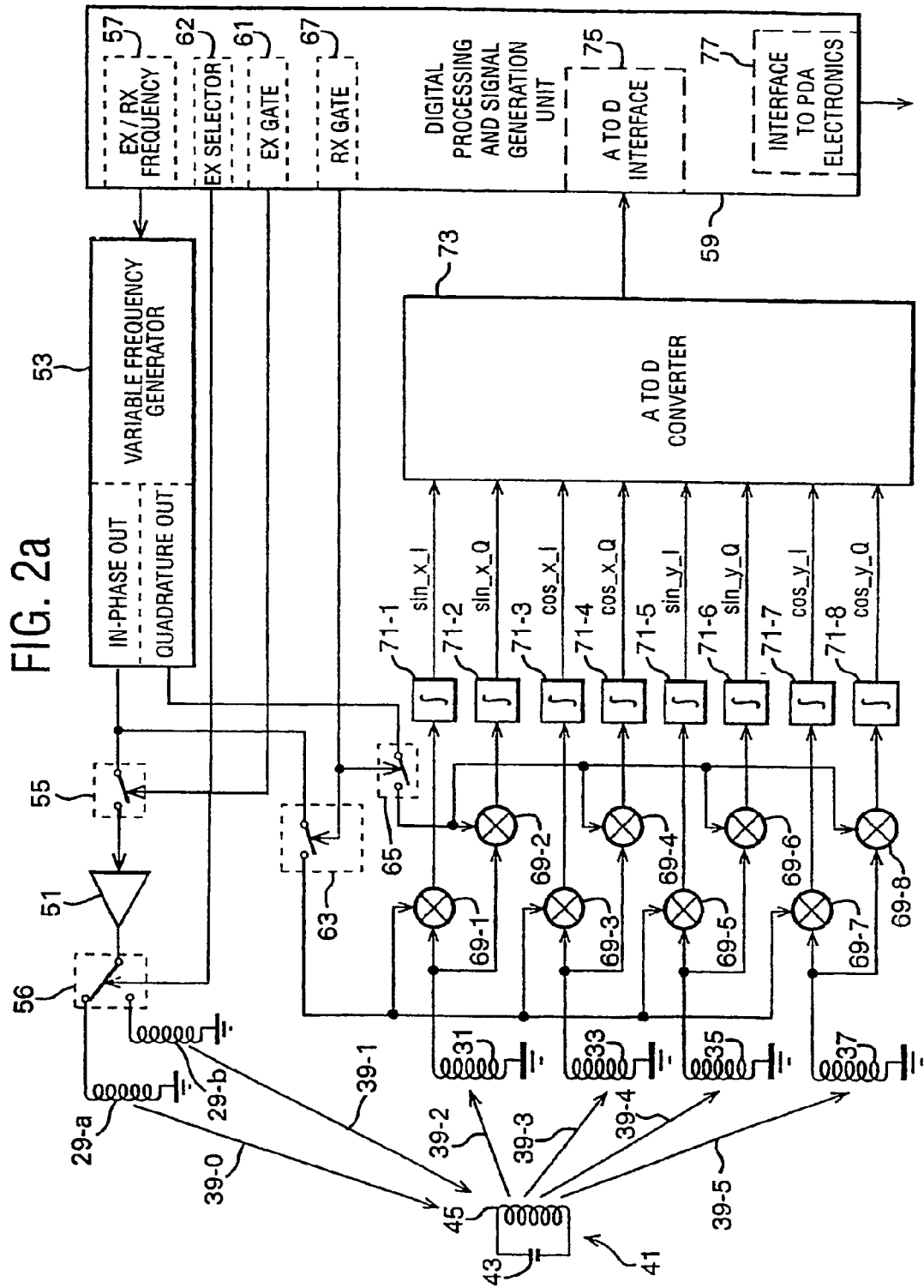
FIG. 2*a* is a schematic functional block diagram illustrating the excitation and processing electronics of the x-y digitising system and illustrating the magnetic coupling between excitation windings of the digitising system and the resonant stylus and the magnetic coupling between the resonant stylus and four sensor windings which form part of the digitising system.
Figure 2B:
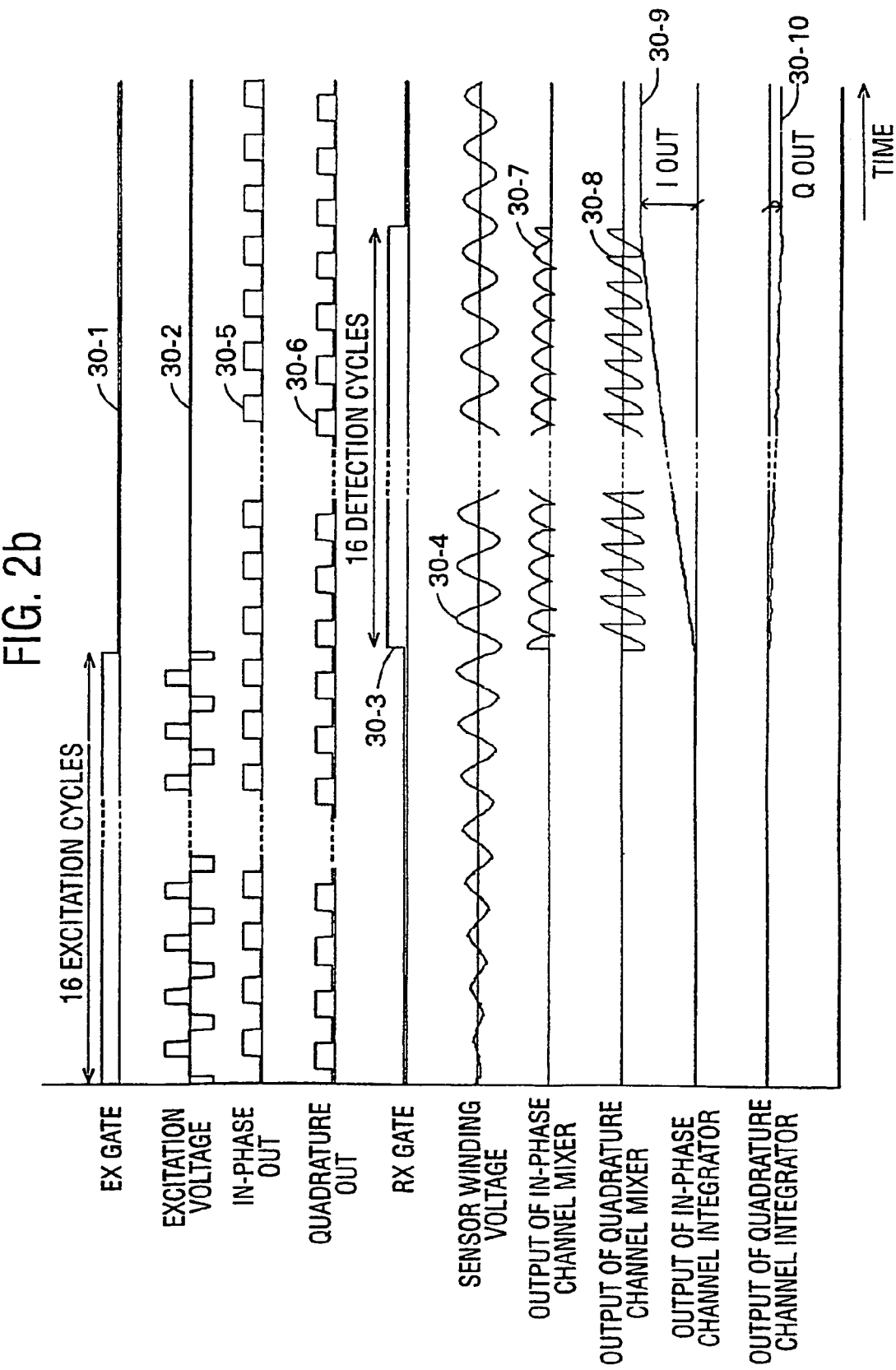
FIG. 2b is a timing plot illustrating the form of various signals within the x-y digitising system shown in FIG. 2a during an excitation and receive cycle.

FIG. 2a schematically illustrates a functional block diagram of the digitising system's processing electronics and FIG. 2b illustrates some of the signals in the digitising system during an excitation and receive cycle. FIG. 2a also illustrates the way in which excitation windings and the sensor windings interact with the resonant stylus 5. In particular, FIG. 2a schematically shows two excitation windings 29-a and 29-b, two x-sensor windings 31 and 33 for sensing x position and two y-sensor windings 35 and 37 for sensing y position. As illustrated by the arrows 39, these windings are operable, in use, to couple electromagnetically with a resonant circuit 41 (comprising a capacitor 43 and an inductor coil 45) in the resonant stylus 5.

In operation, an excitation current is applied to one of the excitation windings 29 through an excitation driver 51 and switch 56. In this embodiment, the excitation current comprises a sequence of positive and negative pulses having a fundamental frequency component ($F_0$) of approximately 100 kHz, which is approximately the resonant frequency of the resonant circuit 41. This excitation signal is generated by a variable frequency generator 53 which generates an appropriate excitation voltage which is applied to the excitation driver 51 through a switch 55. In this embodiment, the frequency of the excitation voltage generated by the generator 53 is set by an excitation/receive frequency control circuit 57 which forms part of a digital processing and signal generation unit 59. As those skilled in the art will appreciate, by using such a variable frequency generator 53, the digitising system can be reconfigured to operate with a stylus having a different resonant frequency.

The excitation current flowing in the excitation windings 29 generates a corresponding electromagnetic field which couples, as indicated by the arrows 39-0 and 39-1, with the resonant circuit 41 and causes it to resonate. When the resonator 41 is resonating, it generates its own electromagnetic field which couples, as represented by the arrows 39-2, 39-3, 39-4 and 39-5, with the sensor windings 31, 33, 35 and 37 respectively. As will be explained in more detail below, the sensor windings 31, 33, 35 and 37 are designed so that the coupling between them and the resonant stylus varies with the x or y position of the stylus 5. Therefore, the signals received in the sensor windings will vary with the position of the resonator 41 relative to the respective sensor winding. Consequently, by suitable processing of the signals received in the sensor windings, the x-y position of the resonator 41, and hence of the resonant stylus 5, can be determined relative to the sensor windings.

In this embodiment, the excitation current is not continuously applied to the excitation winding 29. Instead, bursts of the excitation current are applied, with the application of the excitation bursts being controlled by opening and closing the switch 55. As shown in FIG. 2a, this is controlled by an excitation gate controller 61 which forms part of the digital processing and signal generation unit 59. An excitation selector 62 (also forming part of the digital processing and signal generation unit 59) controls the position of the switch 56 to control which of the excitation windings 29 is to be energised. In this embodiment, in order to reduce the effect of any breakthrough from the excitation winding 29 to the sensor windings, the signals induced in the sensor windings are only detected between the bursts of the excitation current. This is achieved by controlling the positions of switches 63 and 65 with the receive gate controller 67 which forms part of the digital processing and signal generation unit 59. This mode of operation is referred to as pulse echo and works because the resonator 41 continues to resonate after the burst of excitation current has ended. This mode of operation also minimises power consumption of the digitiser.

FIG. 2b shows the excitation gate signal 30-1 applied to the switch 55; the excitation voltage 30-2 applied to one of the excitation windings 29; the receive gate signal 30-3 applied to the switches 63 and 65 and a typical voltage 30-4 induced in one of the sensor windings. In this illustration, sixteen excitation cycles (counting the start and end pulses as halves) are applied to the excitation winding 29 which energises the resonator 41 in the stylus 5 which in turn induces a signal such as 30-4 in each of the sensor windings. In this embodiment, the sensor windings 31, 33, 35 and 37 used in this embodiment and are in spatial phase quadrature relative to each other and are arranged to have sinusoidal coupling factors with the resonant stylus 5. In view of the sinusoidal coupling and quadrature arrangement of the sensor windings, the four signals induced in the four sensor windings from the resonant circuit 41 can be approximated by:

$$E_{31}(t) = Ae^{-t/\tau} \sin\left[\frac{2\pi x}{L_x}\right] \cos[2\pi F_o t + \varphi] \quad (1)$$

$$E_{33}(t) = Ae^{-t/\tau} \cos\left[\frac{2\pi x}{L_x}\right] \cos[2\pi F_o t + \varphi] \quad (2)$$

$$E_{35}(t) = Ae^{-t/\tau} \sin\left[\frac{2\pi y}{L_y}\right] \cos[2\pi F_o t + \varphi] \quad (3)$$

$$E_{37}(t) = Ae^{-t/\tau} \cos\left[\frac{2\pi y}{L_y}\right] \cos[2\pi F_o t + \varphi] \quad (4)$$

where A is a coupling coefficient which depends upon, among other things, the distance of the stylus 5 from the windings and the number of turns in the sensor windings; x is the x-position of the resonant stylus relative to the sensor windings; y is the y-position of the resonant stylus relative to the sensor windings; $L_x$ is a spatial wavelength of the sensor windings in the x-direction; $L_y$ is a spatial wavelength of the sensor windings in the y-direction; $e^{-t/\tau}$ is the exponential decay of the resonator signal after the burst of excitation signal has ended, with $\tau$ being a resonator constant which depends upon, among other things, the quality factor of the resonant circuit 41; and $\varphi$ is an electrical phase shift caused by a difference between the fundamental frequency of the excitation current and the resonant frequency of the resonator 41. In this embodiment, the resonant stylus 5 is designed so that its resonant frequency changes with the pressure applied to the tip of the stylus. This change in frequency causes a change in the phase shift $\varphi$.

Therefore, both the x-y position information of the resonant stylus 5 and the phase shift $\varphi$ can be determined from the signals induced in the sensor windings by suitable demodulation and processing. As shown in FIG. 2a, this demodulation is achieved by mixing the received signals with the excitation voltage generated by the variable frequency generator 53 in the mixers 69-1 to 69-8. In this embodiment, an in-phase component 30-5 and a quadrature phase component 30-6 (shown in FIG. 2b) of the excitation signal are mixed with the signal induced in each of the sensor windings. This generates an in phase (I) component 30-7 and a quadrature phase (Q) component 30-8 of each of the demodulated signals. In this embodiment, the in phase components 30-7 of the demodulated signals from all the sensor windings are used to determine the position information and the in phase and quadrature phase components of the demodulated signals are used to determine the electrical phase shift (i.e. $\varphi$). As shown in FIG. 2a, the output from each mixer 69 is input to a respective integrator 71-1 to 71-8 which, after being reset, integrates the output from the mixer over a time period which is a multiple of $1/F_0$ (in order to remove the effect of the time varying components output by the mixer). In this embodiment, the integration time is controlled by using the receive gate signal 30-3 (which in the illustration allows for the integration to be performed over sixteen excitation periods or cycles). The following equations approximate the outputs from the integrators 71-1 to 71-4:

$$\sin\_x\_I = A_1 \sin\left[\frac{2\pi x}{L_x}\right] \cos\varphi \quad (5)$$

$$\sin\_x\_Q = A_1 \sin\left[\frac{2\pi x}{L_x}\right] \sin\varphi \quad (6)$$

$$\cos\_x\_I = A_1 \cos\left[\frac{2\pi x}{L_x}\right] \cos\varphi \quad (7)$$

$$\cos\_x\_Q = A_1 \cos\left[\frac{2\pi x}{L_x}\right] \sin\varphi \quad (8)$$

where $A_1$ is a constant which varies with, among other things, the constant A, the resonator τ and the integration period. Similar signals are obtained from integrators 71-5 to 71-8, except these vary with the y-position rather than with the x-position. FIG. 2b also illustrates the output voltage 30-9 from one of the in-phase integrators and the output voltage 30-10 from one of the quadrature phase integrators.

As shown in FIG. 2a, the outputs from the integrators 71 are input to an analogue-to-digital converter 73 which converts the outputs into digital values which are input to the A to D interface unit 75 in the digital processing and signal generation unit 59. The digital processing and signal generation unit 59 then performs an arc tangent function (atan2) on the sin_x_I signal and the cos_x_I signal to determine the x-position of the resonant stylus 5 and similarly performs an arc tangent function on the sin_y_I signal and the cos_y_I signal to determine the y-position of the resonant stylus 5. The digital processing and signal generation unit 59 also calculates an arc tangent function on the quadrature phase component and the in phase component of the signals from the same sensor windings, in order to determine the electrical phase angle φ.

As shown in FIG. 2a, the in phase and quadrature phase component for the signal induced in each of the sensor windings is calculated. This is because, at certain x and y positions, the ratio of the in phase and quadrature phase components from some of the sensor windings will not be reliable. This occurs when the sin or cos position components are approximately zero. Therefore, in this embodiment, the digital processing and signal generation unit 59 determines the electrical phase angle φ using a weighted combination of the in phase and quadrature phase signals from both the sin and cos windings, where the weighting used varies in dependence upon the determined x and y position of the stylus 5. The processing electronics then uses this electrical phase angle measurement to determine if the tip of the stylus 5 has been brought down into contact with the writing surface of the telephone 1.

Returning to FIG. 2a, after the digital processing and signal generation unit 59 has determined the current x-y position of the resonant stylus 5 and determined whether or not the stylus 5 has been brought into contact with the LCD 3, it outputs this information to the telephone's electronics through the interface unit 77. This information is then used by the telephone's electronics to control information displayed on the LCD 3 and the telephone's mode of operation. In this embodiment, the digital processing and signal generation unit 59 is operable to perform the above calculations approximately 100 times per second when the stylus is in the vicinity of the telephone. However, when the system detects that the stylus 5 is not present, it initially enters a standby state in which the above excitation and processing is performed approximately 20 times per second. After a predetermined length of time in this standby state, the system enters a sleep state in which the above calculations are performed approximately 2 times per second. Once the presence of the stylus 5 is detected again, the processing resumes at the 100 times per second rate.

Figure 3A:
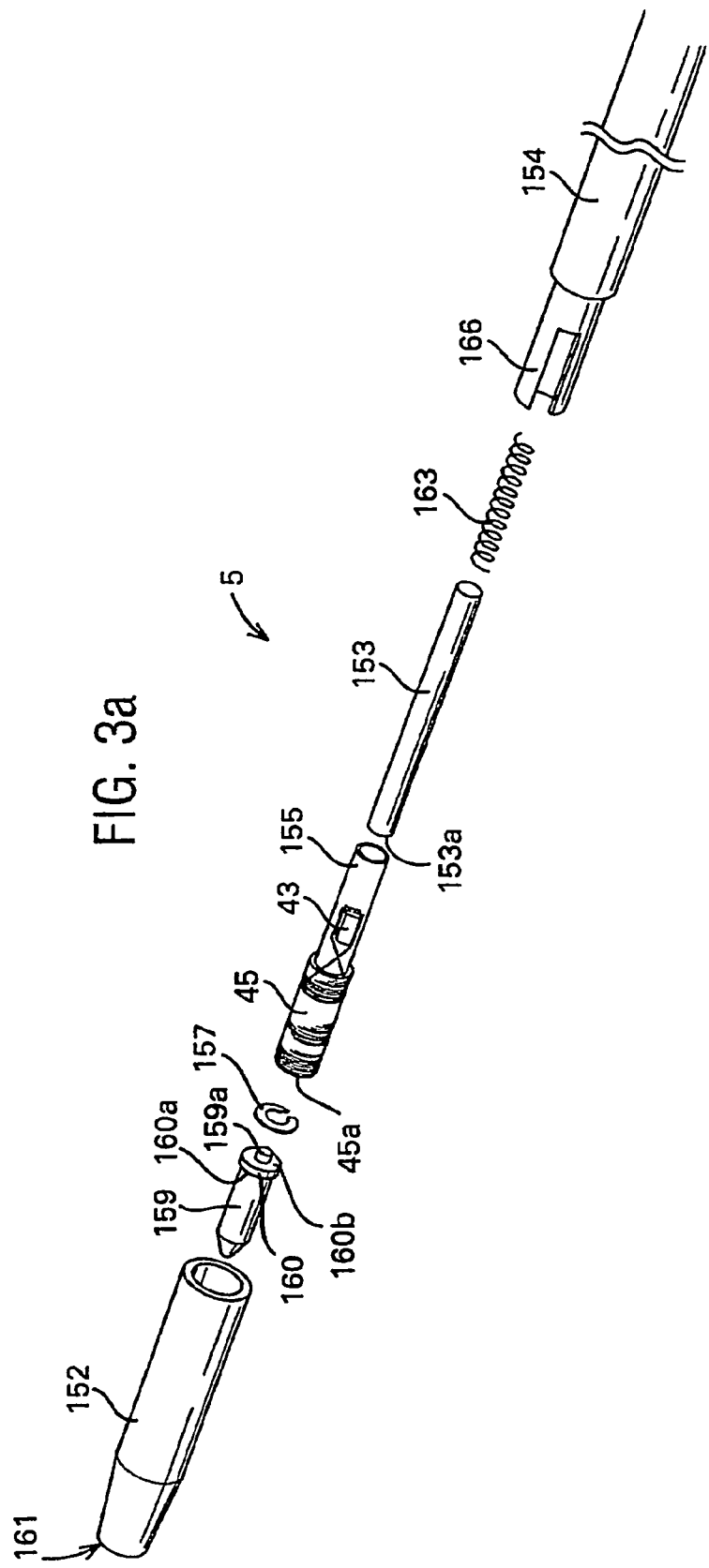
FIG. 3a is an exploded perspective view of the resonant stylus shown in FIG. 1.

As discussed above, the resonant stylus 5 used in the present embodiment comprises a resonant circuit 41 which includes an inductor coil 45 and a capacitor 43. The resonant stylus 5 is also designed so that the resonant frequency of the resonant circuit 41 changes when the tip of the stylus 5 is brought down into contact with the writing surface of the digitising system. The particular structure of the resonant stylus 5 used in this embodiment is shown in an exploded view in FIG. 3a. As shown, the stylus 5 comprises a hollow front body portion 152 and a hollow rear body portion 154 which house: the resonant circuit 41 comprising the inductor coil 45 and the capacitor 43; a 2 mm diameter ferrite rod 153; a plastic sleeve 155 having an inner diameter of 2.1 mm and an outer diameter of 2.2 mm; a split washer 157; a nib 159; and a spring 163. The coil 45 is manufactured from self-bonding enamelled copper wire for low-cost by eliminating a coil former. The ends of the coil 45 are welded to the side of a surface mount capacitor 43 to form the resonant circuit 41. The plastic sleeve 155 having a thin wall section (of approximately 50 microns) made from spirally wound and bonded plastic sheet fits inside the coil 45 and acts as a bearing surface for the ferrite rod 153 and prevents the ferrite rod 153 from rubbing against the capacitor 43 during use. The plastic sleeve 155 has a much thinner cross-section than can be achieved with an injection-moulded component, thereby enabling higher resonator Q-factor and hence lower system power consumption.

Figure 3B:
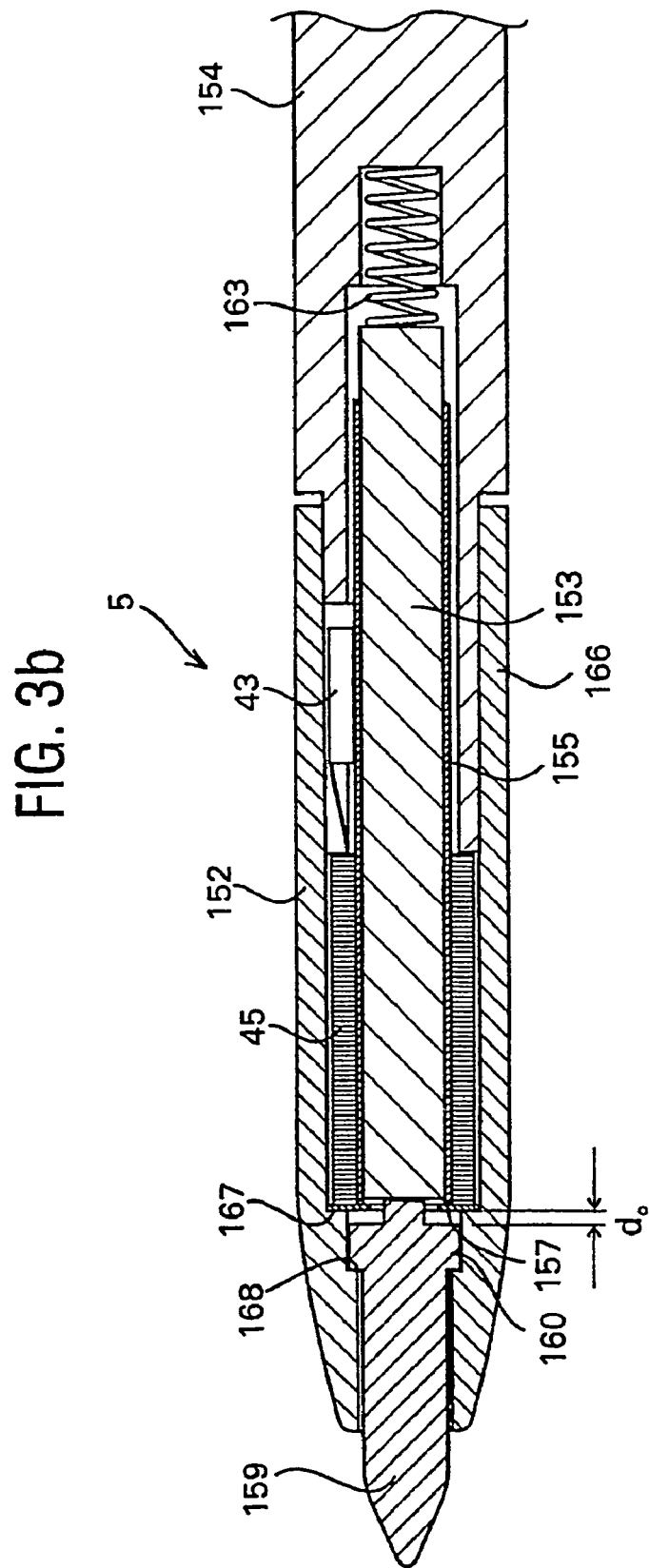
FIG. 3b is a cross-sectional view of the resonant stylus shown in FIG. 1.

FIG. 3b shows the assembled stylus 5 in cross-section. The nib 159 and the ferrite rod 153 are slidably mounted within the stylus body and spring-biased (by spring 163) towards the front end 161 of the front body portion 152. The movement of the ferrite rod 153 in this forward direction is, however, limited by the abutment of a front face 160a of an enlarged head 160 of the nib 159 with a second shoulder 168 of the front body portion 152. When pressure is applied to the nib 159 of the stylus 5 against the biasing force of the spring 163, the nib 159 and the ferrite rod 153 move towards the rear body portion 154 until a rear face 160b of the nib's head 160 abuts against the split washer 157. As shown in FIG. 3b, the ferrite rod 153 can, therefore, only move a predetermined distance ($d_0$) when pressure is applied to the end of the nib 159. In this embodiment, the stylus 5 is designed so that the click distance ($d_0$) is 0.35 mm. This movement of the front face 153a of the ferrite rod 153 from the front face 45a of the coil 45 causes a decrease in the inductance of the coil 45 due to the reduced coupling between the ferrite rod 153 and the coil 45, which in turn gives rise to an increase in the resonant frequency of the resonant circuit 41. The processing electronics can then detect when the stylus 5 is brought into contact with the writing surface from the value of the phase angle φ, which varies with the resonant frequency of the stylus 5.

A brief description has been given above of the way in which the digitiser system of the present embodiment determines the x-y position and the status of the resonant stylus 5 relative to the sensor windings. The particular form of excitation and sensor windings used in this embodiment will now be described in more detail.

Excitation Windings

Figure 4A:
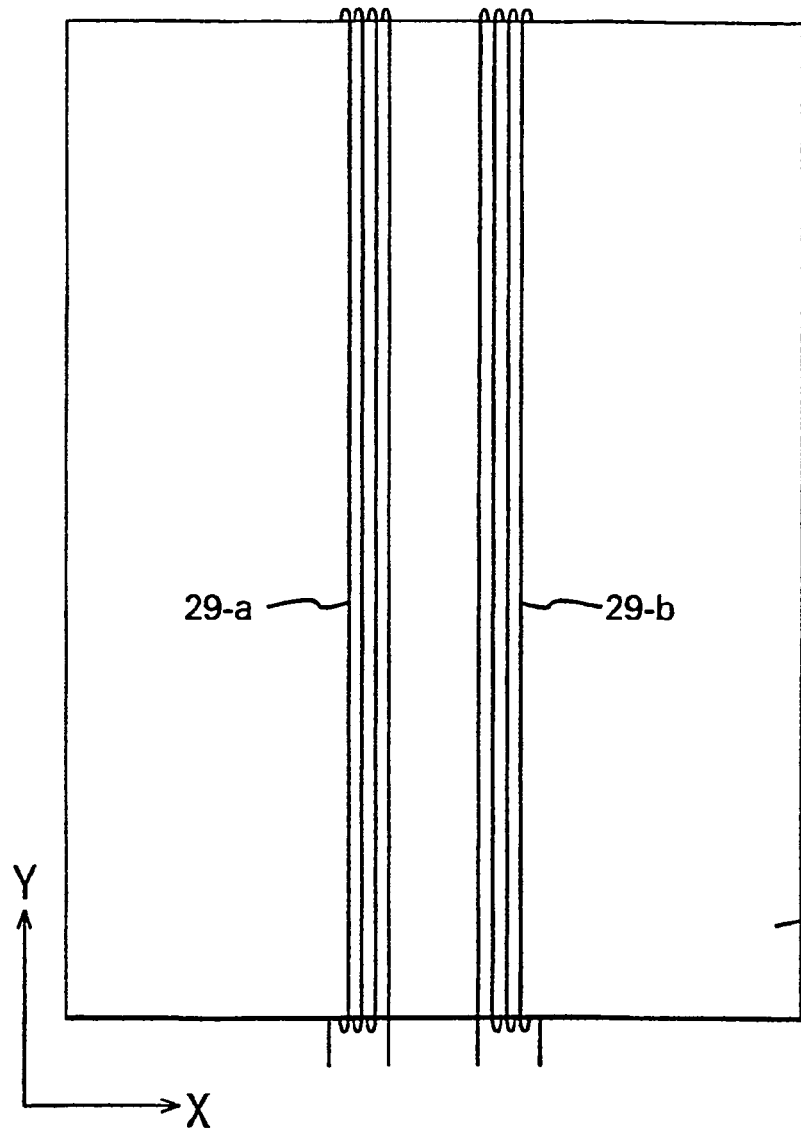
FIG. 4a is a schematic diagram illustrating the way in which the excitation windings shown in FIG. 2a are wound around a printed circuit board forming part of the x-y digitising system.

FIG. 4a is a schematic diagram illustrating a circuit board 13 around which the two excitation windings 29-a and 29-b are wound. In this embodiment, a layer of magnetic material (not shown) is laminated to the circuit board 13 and the excitation windings 29 are wound around both the circuit board 13 and the layer of magnetic material. The layer of magnetic material provides a magnetic path for the field generated by the excitation winding 29 so that more of the field extends to the edge of the circuit board 13. The material used for this layer of magnetic material depends on the excitation frequencies to be applied to the excitation winding 29. For frequencies in the range of 0 to 100 kHz, a 50 μm to 200 μm mumetal is an optimum screen material. However, for higher frequencies up to for example 500 kHz, spin melt ribbon is preferably used.

Figure 4B:
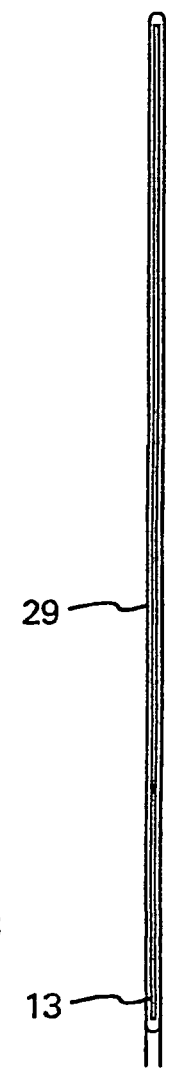
FIG. 4b schematically illustrates the arrangement of the excitation windings wound around the printed circuit board viewed along the long side of the printed circuit board.
Figure 4C:
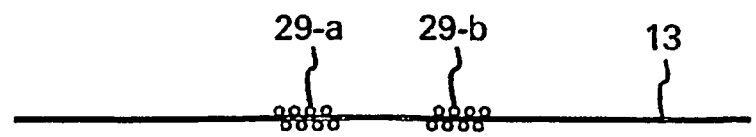

As shown in FIG. 4a, the two excitation windings 29-a and 29-b are wound in opposite directions around the printed circuit board 13. FIG. 4b illustrates the view of the assembly shown in FIG. 4a when viewed towards the longer edge of the printed circuit board 13 and FIG. 4c illustrates a cross-sectional view of the arrangement shown in FIG. 4a.

Figure 5A:
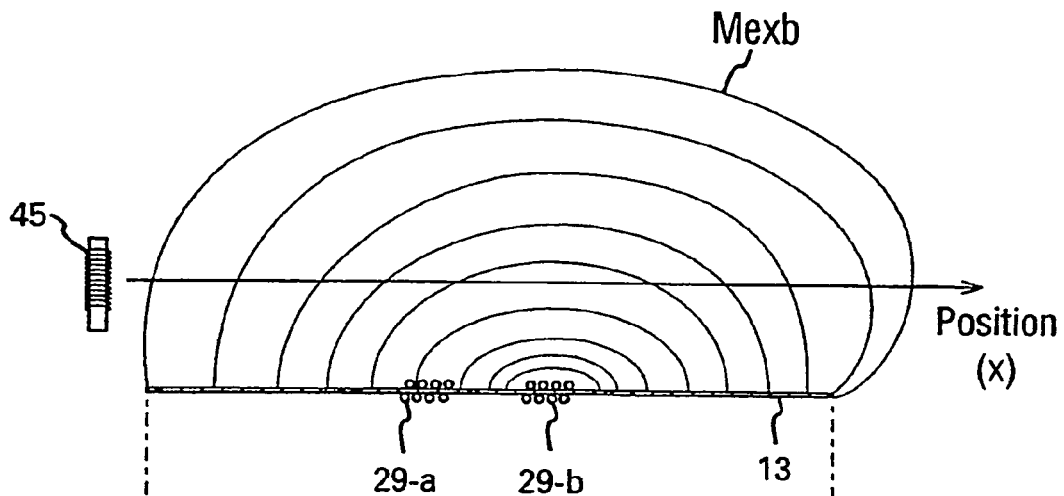
FIG. 5a schematically illustrates the magnetic field created by passing a current through one of the excitation windings shown in FIG. 4c.
Figure 5B:
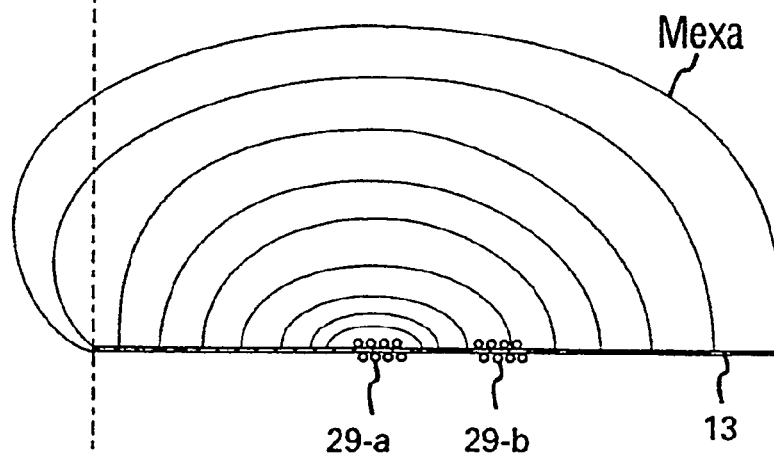
FIG. 5b schematically illustrates the form of the magnetic field generated by passing a current through the other excitation windings shown in FIG. 4c.

FIG. 5a illustrates the magnetic field Mexb that is generated by the excitation winding 29-b when a current is passed through it (ignoring the field generated below the circuit board 13). FIG. 5a also illustrates the coil 45 of the resonant stylus 5 which is designed to receive the magnetic field Mexb to thereby power the stylus for re-radiating to the sensor windings of the x-y digitiser system. As discussed above, the stylus 5 is moveable in any direction over the working area of the x-y digitising system although FIG. 5a only illustrates movement in the x-direction in view of the cross-sectional view. FIG. 5b illustrates the corresponding magnetic field Mexa that the other excitation winding 29-a generates when a current is passed through it (again ignoring the field generated below the circuit board 13).

Figure 5C:
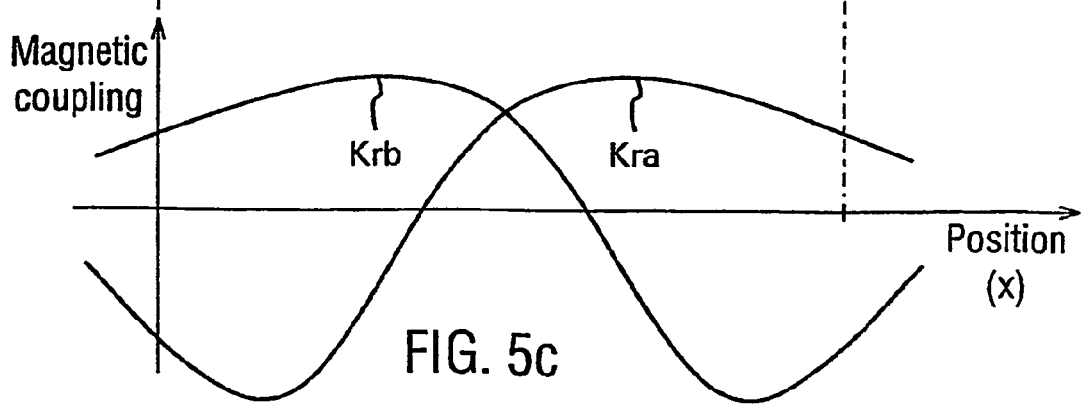
FIG. 5c is a plot illustrating the way in which the magnetic coupling between the resonant stylus and the two excitation windings varies with position of the stylus in an x-direction of the digitising system.

FIG. 5c is a plot illustrating the way in which the magnetic coupling (Kra) between the excitation winding 29-a and the coil 45 and the magnetic coupling (Krb) between the excitation winding 29-b and the coil 45 varies with the position of the coil 45 along the x-direction above the printed circuit board 13. As shown, each of the two plots includes a point where the coupling factor is zero. When the stylus 5 is held perpendicular to the circuit board 13, this point is approximately when the stylus 5 is directly above the respective excitation winding 29. Further, as can be seen from FIG. 5c, there are other positions in the plots where the coupling factor is low. In particular, excitation winding 29-a is off centre to the left and the corresponding coupling factor (Kra) is low when the stylus 5 is to the extreme right-hand side of the circuit board 13. Similarly, excitation winding 29-b is off centre to the right and the magnetic coupling factor (Krb) is low when the stylus 5 is to the extreme left-hand side of the circuit board 13. However, in each case, the other excitation winding 29 has a relatively high magnitude of coupling factor and it is therefore possible to maintain transmitting power to the stylus 5 regardless of the x-position of the stylus relative to the circuit board 13.

As shown in FIG. 4a, the geometry of the excitation windings 29 are substantially uniform in the direction perpendicular to the x-direction and in the plane of the circuit board (i.e. in the y-direction). The magnetic field lines illustrated in FIG. 5 are therefore relatively uniform in the y-direction so that the system is able to power the stylus 5 for any given y-position in the vicinity of the circuit board 13.

If the user tilts the stylus 5 about the y-axis, then this is broadly equivalent to an offset in the x-position in the plot shown in FIG. 5c. However, since the stylus 5 can be powered for any given x-position in proximity of the circuit board 13, such tilting of the stylus 5 about the y-axis does not affect the powering of the stylus 5. If the user tilts the stylus 5 about the x-axis, with the tip of the stylus 5 at a constant position, then this has the effect of: i) reducing the coupling factor due to the coil 45 in the stylus 5 being at an angle to the excitation magnetic field; and ii) increasing the coupling due to the closer proximity of the stylus 5 to the circuit board 13. It has been found that these two effects largely cancel each other out. Therefore, although tilting the stylus 5 may alter the coupling factors between the excitation windings 29 and the coil 45 in the stylus 5, it is still always possible to power the stylus 5 by selecting which excitation coil 29 to power depending on the current x-y position of the stylus 5.

In this embodiment, the current position of the stylus 5 (as determined by the processing electronics) is used to control which one of the two excitation windings 29 is used to power the stylus. In this embodiment, data representing the magnetic coupling plots shown in FIG. 5c are stored within the processing electronics. The determined current position of the stylus 5 is then compared with this data to identify which one of the two excitation windings 29 has the largest magnetic coupling with the stylus 5 and this excitation coil is the one used to power the stylus 5.

Figure 6:
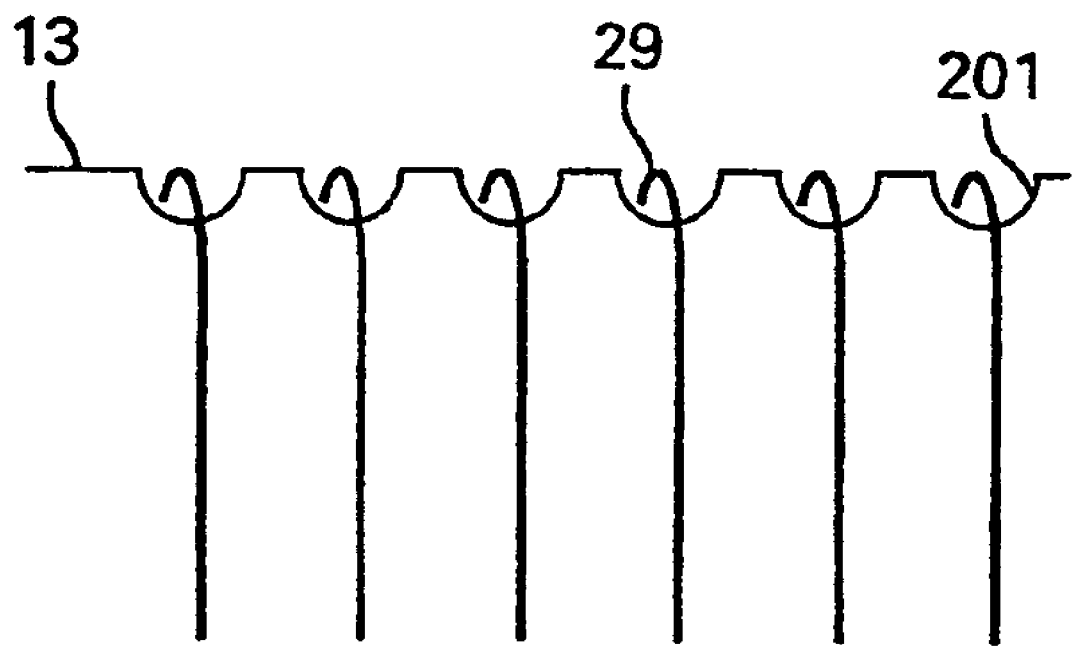
FIG. 6 schematically illustrates the way in which notches may be made along the edge of the printed circuit board to facilitate the accurate winding of the excitation coils around the printed circuit board.

As shown in FIG. 6, in this embodiment slots 201 are provided along the edge of the circuit board 13 to facilitate the accurate winding of the excitation winding 29 around the circuit board 13. The free ends of the excitation windings 29 are then connected to the appropriate connection pads on the printed circuit board 13 by soldering or welding or by some other connection technology.

Unlike the previous stylus powering approaches described in the prior art discussed above, the excitation windings 29 are arranged so that their magnetic axes are non-orthogonal (and indeed are preferably parallel) to the plane of the printed circuit board 13. The inventor has found that this arrangement of the windings 29 provides a more efficient coupling to the coil 45 in the stylus 5 than with the previous designs such as those described in U.S. Pat. No. 4,878,553 or WO 00/33244 discussed above.

Additionally, the inventor has found that with this new geometry of the excitation windings 29, it is possible to power the stylus 5 at far greater distances from the perimeter of the circuit board 13 than with the previous designs. This is because with the previous design of the excitation windings, the magnetic field powering the stylus 5 is substantially parallel to the circuit board 13 near to its edges, with the result that the axis of the coil 45 in the stylus (being usually roughly perpendicular to the circuit board 13) is at such an angle to the magnetic field as to reduce the coupling between that field and the stylus 5 to below acceptable levels. Further, when the component of the field parallel to the axis of the coil 45 in the stylus 5 changes sign, the sign of the coupling changes and the place at which this occurs may not be known. With the new geometry, the magnetic field powering the stylus 5 is roughly perpendicular to the circuit board 13 even near its edges, and the field component parallel to the axis of the coil 45 does not change sign near the edge. In the present embodiment, the regions in which the excitation field arising from one of the excitation winding 29 becomes parallel to the board, are among those in which the other excitation winding is used to energise the stylus 5.

Additionally, in this embodiment, since the excitation windings 29 are not formed from printed conductors but from wire wound coils, the excitation windings can be formed from a much greater mass of copper. This additional mass of copper yields lower excitation winding losses for a given excitation field, thereby minimising power loss and hence maximising battery life.

The excitation magnetic field generated by the excitation windings 29 used in this embodiment will also have a smaller coupling to any conductive metal bezel placed around the perimeter of the circuit board 13. This is because most of the excitation magnetic field lines shown in FIGS. 5a and 5b do not link with the loop formed by the bezel. Most of the field lines both emerge and re-enter the magnetic material laminated to the circuit board 13 inside the bezel and most of those that do not, both emerge and re-enter this magnetic material outside the bezel loop.

The above described excitation windings may be used with any known sensor windings such as those described in WO 00/33244 and will be mounted below the display 3 of the telephone 1. However, the preferred form of the sensor windings used in this embodiment will now be described.

Sensor Windings

Figure 7A:
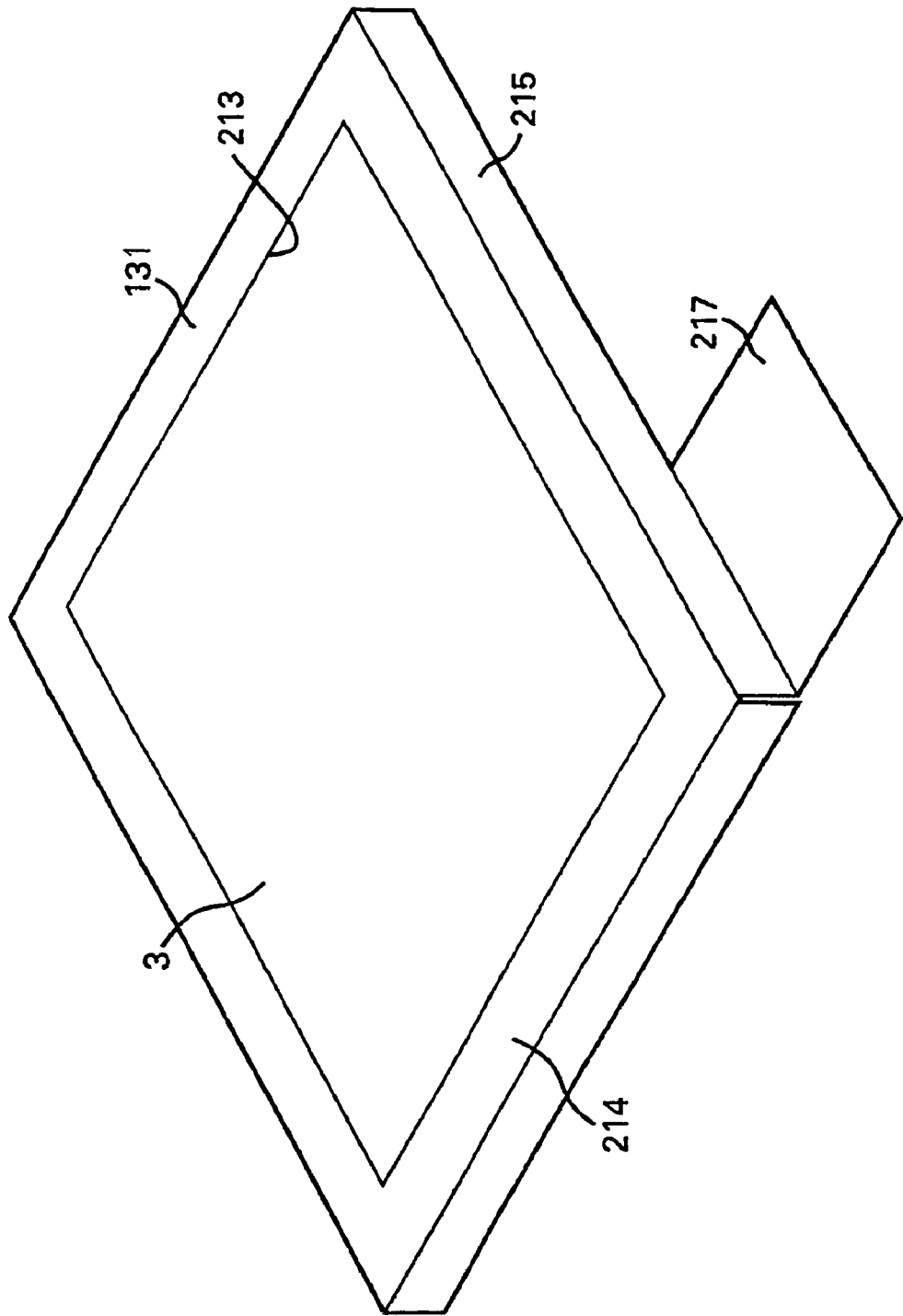

In this embodiment, the sensor windings are formed on a folded printed circuit board 131 which is illustrated in FIG. 7*a*. As shown, the circuit board 131 is folded so as to fit in front of and around the side of the liquid crystal display 3. The circuit board 131 also includes a transparent window 213 so that the active area of the display 3 is not covered. The folded circuit board 131 therefore includes portions 214 that lie in a plane parallel to the plane of the LCD 3 and portions 215 which lie in planes perpendicular to the plane of the LCD 3. The printed circuit board 131 also includes a folded connector portion 217 which carries the connection pads for the sensor windings and is used to connect the sensor windings to the processing electronics.

Figure 7B:
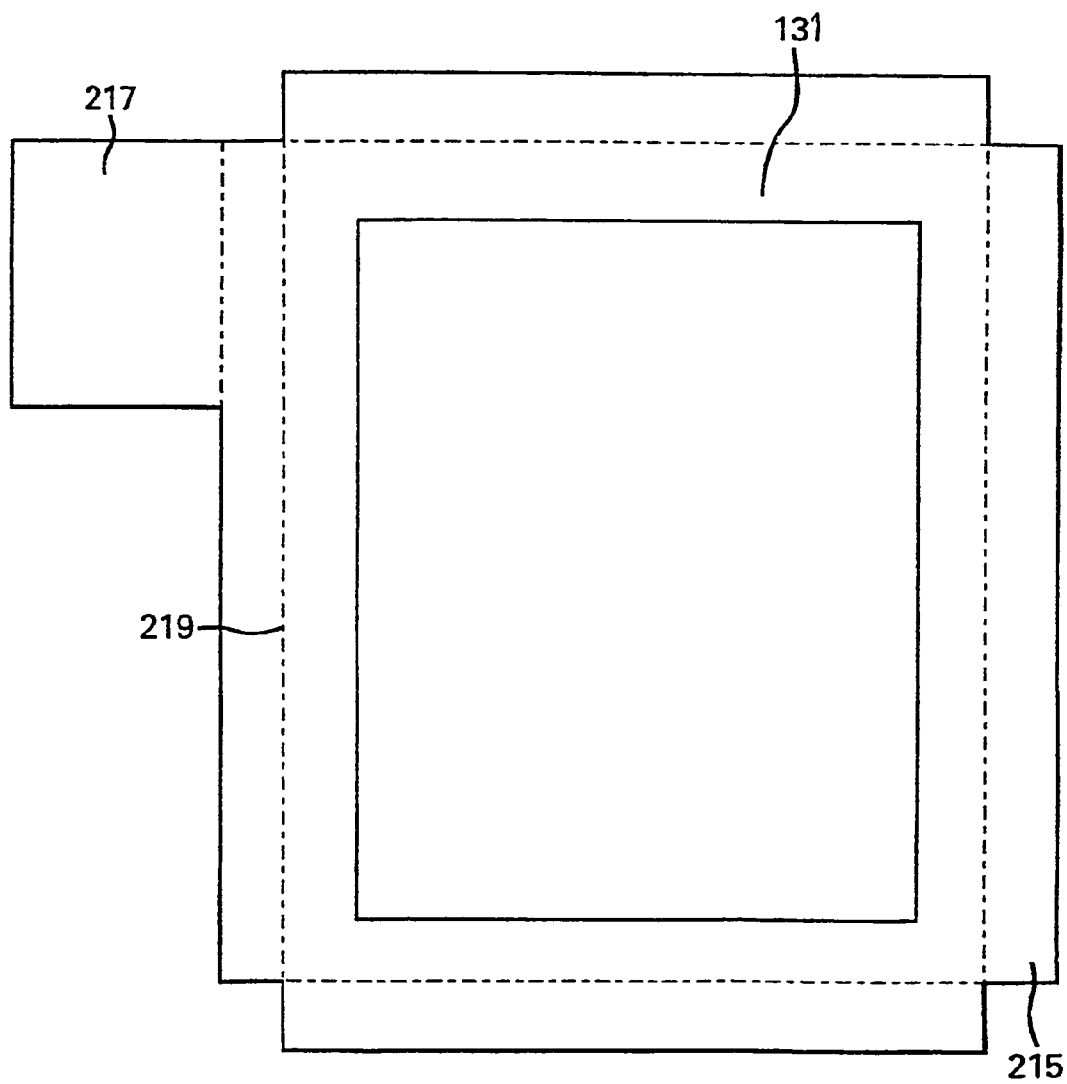

FIG. 7*b* illustrates the outline of the flexible printed circuit board 131 used in this embodiment, showing the fold lines of the circuit board as dash lines 219. FIG. 7*c* schematically illustrates the position of the four sensor windings 31,33,35 and 37, each of which is split into two portions a,b located on opposite sides of the rectangular window 213. As shown, the sin x sensor winding 31 is formed by two portions 31-*a* and 31-*b* which both include two turns of conductor and which are connected in series so that the turns of conductor in portion 31-*a* are wound in the opposite direction to the turns of conductor in portion 31-*b*. Similarly, the sin y sensor winding 35 is formed by two portions 35-*a*, 35-*b* which both include two turns of conductor and which are connected in series so that the conductor turns of the first portion 35-*a* are wound in the opposite direction to the conductor turns in the second portion 35-*b*. As shown in FIG. 7*c*, since the sin x and sin y sensor windings are formed on the inside of the fold line 219, these sensor windings will lie, in use, in a plane that is substantially parallel to the plane of the LCD display 3.

The cos x sensor winding 33 is also arranged in two portions 33-*a*, 33-*b* which are both formed by two turns of conductor. However, these two portions are connected in series so that the turns of conductor in the first portion 33-*a* are wound in the same direction as the turns of conductor in the second portion 33-*b*. Similarly, the cos y sensor winding 37 is also formed by a first portion 37-*a* and a second portion 37-*b* which each include two turns of conductor which are connected in series so that they are wound in the same sense. However, since the cos x and cos y sensor windings 33 and 37 are provided on the outside of the fold line 219, in use, these windings will lie in planes that are substantially perpendicular to the plane of the LCD 3. The effective magnetic axis of these windings will therefore lie substantially parallel to the plane of the LCD 3. In this embodiment, the conductor tracks used to generate the sensor windings are formed as printed conductors on two layers of the flexible circuit board 131 and connected together where appropriate at via holes. The particular arrangement of the conductor tracks on these two layers that are used in this embodiment are shown in FIGS. 7*d* and 7*e*, which also show the connection pads on the connector portion 217 for connecting the sensor windings to the processing electronics.

Figure 8A:
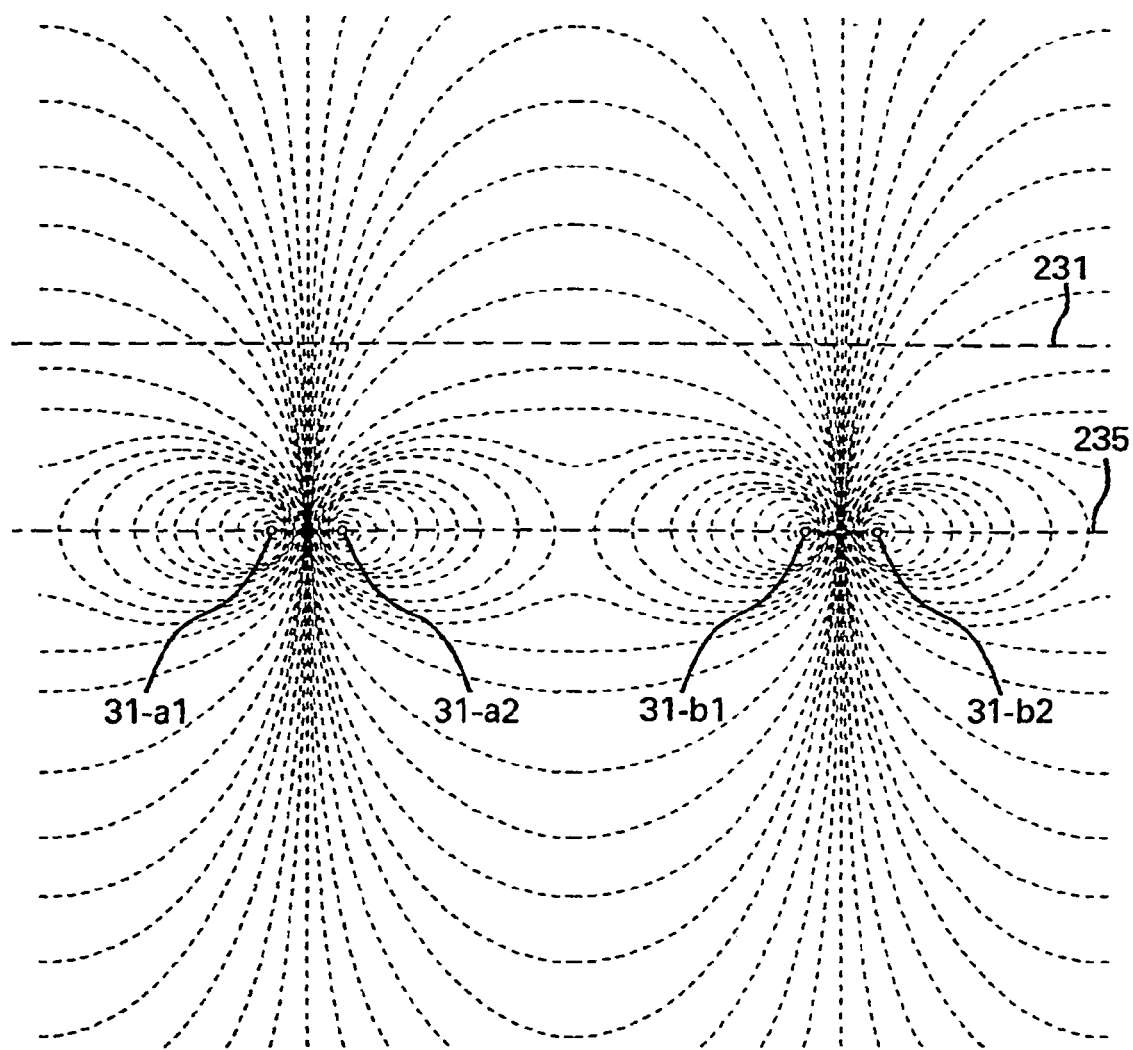
FIG. 8a schematically illustrates the form of the magnetic field generated by the passing current through a sin x sensor winding.

As discussed in the introduction, in this embodiment the sensor windings are arranged so that the magnetic coupling between the resonant stylus 5 and the sensor windings varies with the x or y position in a sinusoidal manner. To illustrate that this is the case, consideration should be given to the magnetic field generated by each of the sensor windings when a current is applied to it, since (due to the reciprocal nature of electromagnetic coupling) this will also define the sensitivity of the sensor winding to magnetic field generated by the resonator 41 in the stylus 5. FIG. 8*a* illustrates the magnetic field lines generated by the sin x sensor winding 31 when a current is applied to it.

For clarity, only one turn of each of the two coil portions 31-*a* and 31-*b* is shown. In use, the coil 45 within the stylus 5 will always be located above the sensor winding 31 and will move, for example, along the dotted line 231. Therefore, considering the vertical component of the magnetic field along the dotted line 231 yields the effective magnetic sensitivity of the sip x sensor winding 31 to a vertically-held stylus 5.

As can be seen by examining the magnetic field lines in FIG. 8*a*, the vertical component of the magnetic field will be at its most positive value in the centre of the loop defined by conductors 31-*a*1 and 31-*a*2 and will have a similar but negative peak value in the centre of the loop defined by conductors 31-*b*1 and 31-*b*2. As those skilled in the art will appreciate, the peak is negative over the right-hand portion 31-*b* because the turns of this portion are wound in the opposite sense to the turns of the first portion 31-*a*. The corresponding sensitivity plot for the sin x sensor winding is, therefore, shown by the plot $S_{31}^V$ shown in FIG. 8*b*. As shown, the sensitivity function varies in an approximate sinusoidal manner, with the pitch ($L_x$) of the sinusoidal variation being approximately twice the width of the circuit board 131 in the x direction (which is defined between the ordinate axis and the vertical line 237).

Figure 9B:
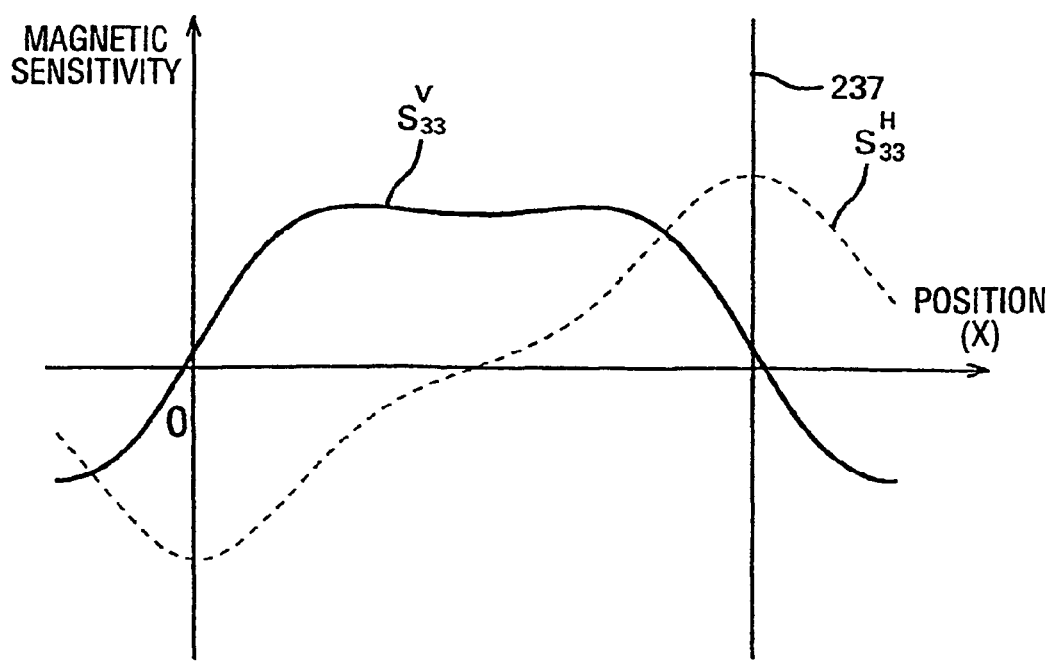
FIG. 9b is a plot illustrating the way in which the magnetic sensitivity of the cos x sensor winding varies with the x position of the stylus.
Figure 9A:
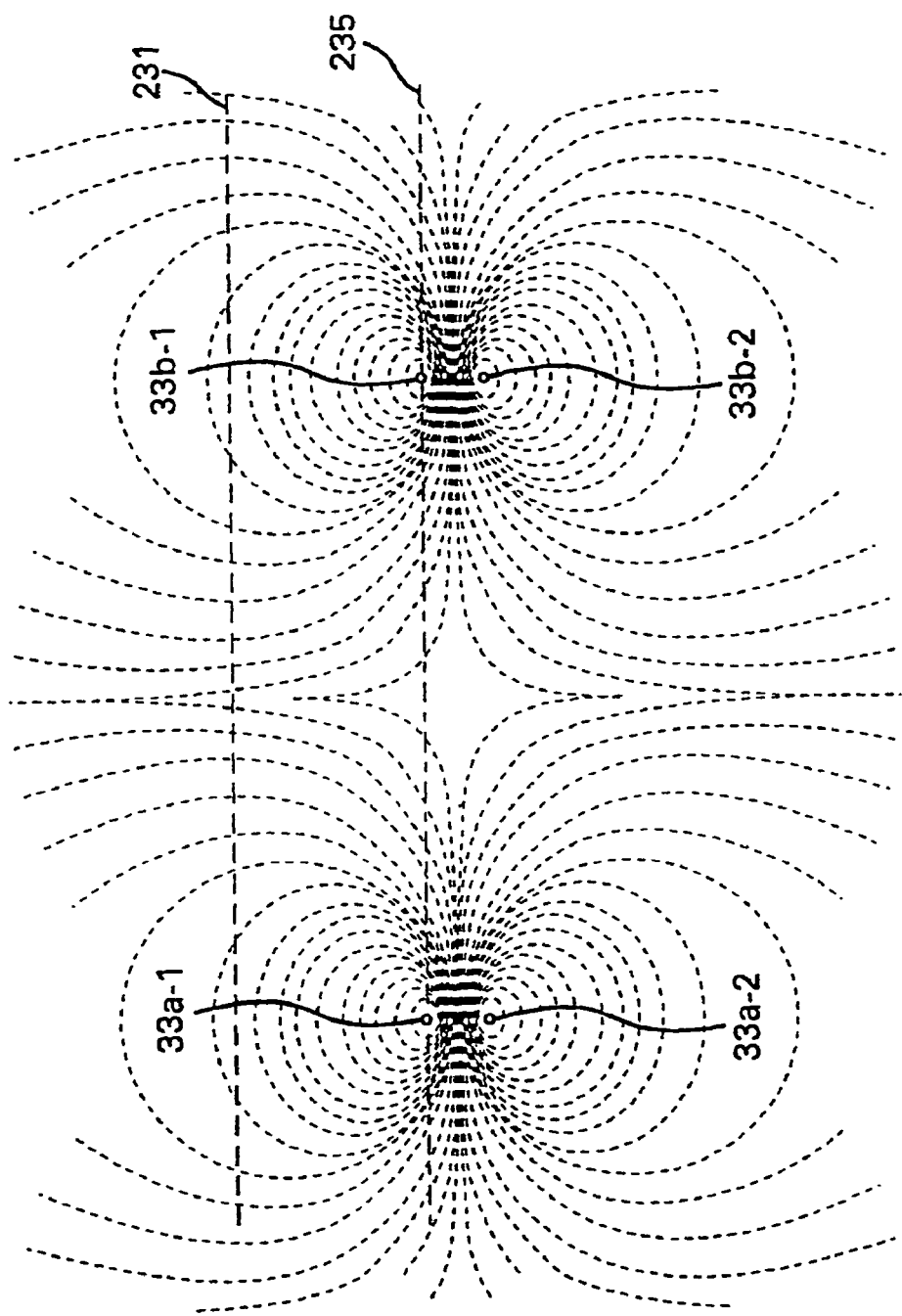
FIG. 9a schematically illustrates the magnetic field generated by passing a current through a cos x sensor winding.

FIG. 9*a* illustrates the magnetic field generated by the cos x sensor winding 33 when current is applied to it. As shown, the magnetic axis of the two portions 33*a*, 33*b* lie in a plane parallel to the plane 235 of the LCD display 3. Considering the vertical component of the magnetic field experienced by the stylus 5 when moving in the x direction along the dotted path 231, it is close to zero directly above each of the two portions 33*a*, 33*b* and peaks between these sensor winding portions. The corresponding vertical magnetic sensitivity function $S_{33}^V$ is therefore shown in FIG. 9*b*. As shown, this sensitivity function varies with the x position of the stylus 5 in an approximate sinusoidal manner, with the period of the variation corresponding to that of the sinusoidal variation of the sin x winding 31 but shifted along the x-direction so that the sinusoidal variations are in spatial phase quadrature.

Figure 8B:
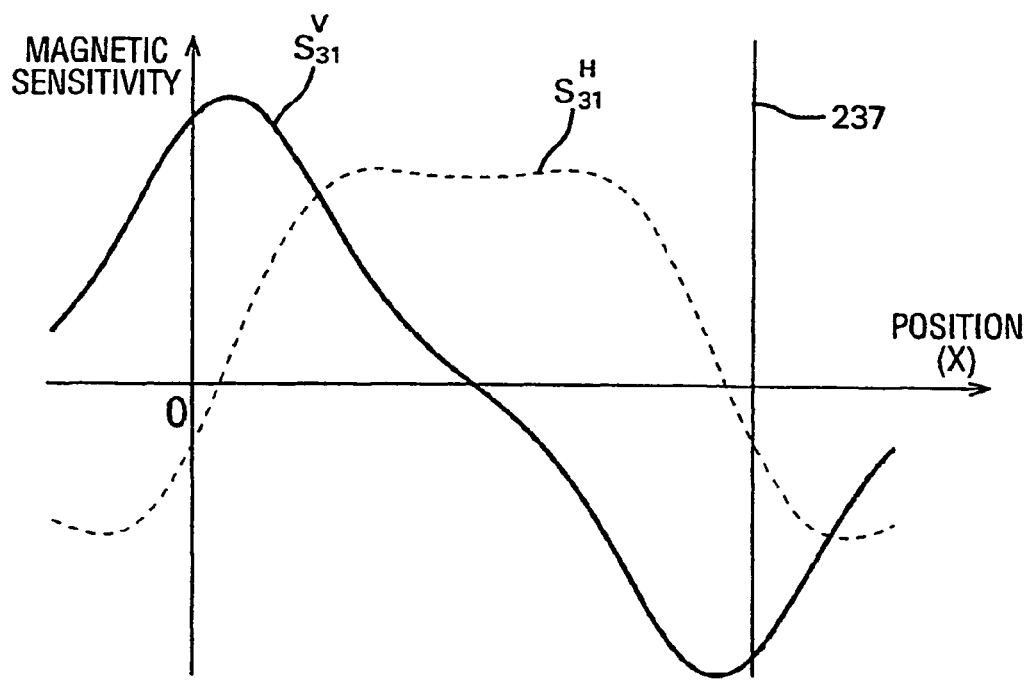
FIG. 8b is a plot illustrating the way in which the magnetic sensitivity of the sin x sensor winding varies with the x position of the stylus.

Additionally, and as shown in FIGS. 8*b* and 9*b*, the sensitivity plots $S_{31}^H$ and $S_{33}^H$ of the sin x and cos x sensor windings to the horizontal component of the magnetic field generated by the resonant stylus 5, also vary in an approximate sinusoidal (and quadrature) manner. This ensures that whatever angle the stylus 5 is held at, the couplings to the sin and cos sensor windings will be in phase quadrature.

As can be seen by comparing FIGS. 8*b* and 9*b*, the sensitivity functions lose their sinusoidal characteristic in the centre of the circuit board 131. However, because the processing electronics performs a ratiometric calculation of the signals from these two windings, these irregularities in the sensitivity functions cancel each other out.

With regard to the sin y and cos y sensor windings 35, 37, these will have similar sensitivity functions but which vary with the y position of the stylus 5 relative to the LCD 3.

The new design of the sensor windings has a number of advantages over the prior art windings such as those described in WO 00/33244. In particular, since the peaks in the sin winding sensitivity functions occur at the edge of the circuit board 131 and since the cos winding sensitivity functions are zero at the edge of the circuit board 131, the sensitivity functions for these sensor windings maintain their sinusoidal characteristic well beyond the edge of the circuit board 131. Therefore, tilt correction algorithms which rely on this sinusoidal variation beyond the edge of the circuit board 131 can correct for tilt even when the stylus is located at the edge of the circuit board 131.

Another advantage of the sensor winding design used in this embodiment is that the sensor windings are all located at the edge of the circuit board and, as a result, the signal levels do not fall off when the stylus 5 approaches the edge of the circuit board 131 which thereby improves power consumption and accuracy. Further, since the sensor windings do not occupy the active area of the LCD display 3, the circuit board 131 can be provided on top of the display (so that the display can be seen through the rectangular window 213). In this way, the sensor windings will be positioned closer to the actual writing surface of the telephone which improves signal level and reduces coupling to other sensitive electronics in the mobile telephone. This arrangement may also allow the elimination of the magnetic shield that is usually placed between the circuit board 131 and the mobile telephone's electronics, thereby saving cost and thickness.

Figure 10:
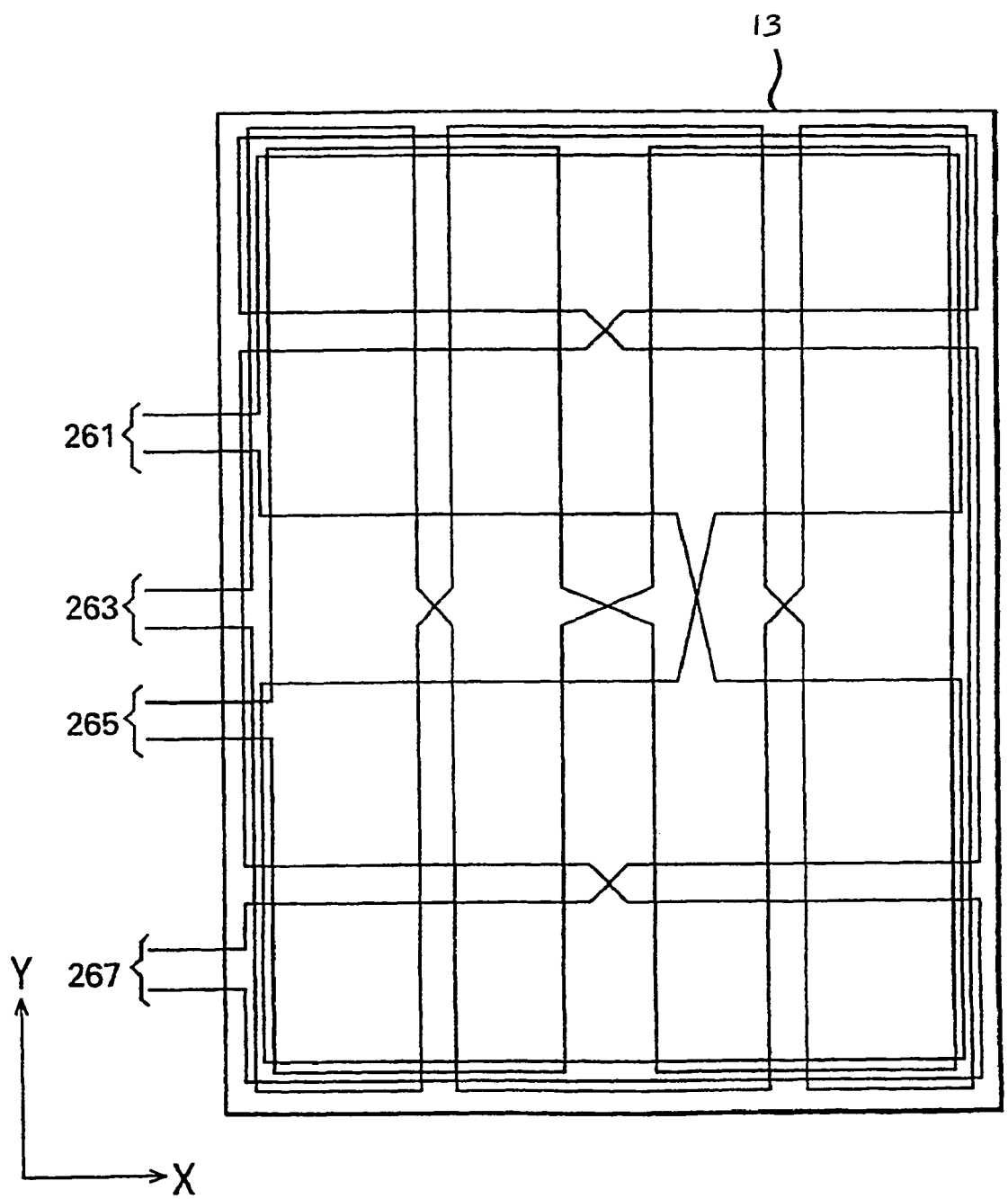
FIG. 10 schematically illustrates the form of four sensor windings which may be used in combination with or instead of the sensor windings formed on the flexible printed circuit board shown in FIG. 7.

The sensor windings described above may be used together with a conventional set of sensor windings underneath the display 3, to improve signal levels and accuracy especially when the stylus 5 is in the centre of the display 3. These additional sensor windings may be formed on the circuit board 13 around which the excitation windings 29 are wound. An example of a conventional set of x-y sensor windings which can be used is shown in FIG. 10. As shown, the set of sensor windings includes a sin x sensor winding 265, a cos x sensor winding 263, a sin y sensor winding 261 and a cos y sensor winding 267, which are all formed on the printed circuit board 13. These additional sensor windings may be connected separately to the processing electronics or they may be connected in series with the corresponding sensor windings on the flexible circuit board 131.

A problem with the conventional set of sensor windings shown in FIG. 10 is that it includes many conductors near the edge of the circuit board 13 and, in particular, at the corners thereof. This problem is increased further if each of the sensor windings 261,263,265,267 includes multiple turns of conductor. The position of the conductors at the corners may therefore be limited by the manufacturing technique used to manufacture the circuit board 13. For example, if the conductors are implemented using 0.1 mm wide conductor tracks separated by 0.1 mm gaps on a conventional printed circuit board, then there can be a maximum of only 5 tracks per millimetre around the edge on each layer of the printed circuit board. Since the position of the conductors is critical to the accuracy of the sensor windings, this problem is particularly important near the corners. Whilst this problem can be overcome by increasing the size of the circuit board, this is impractical in space critical applications such as in the present mobile telephone device 1.

Figure 11A:
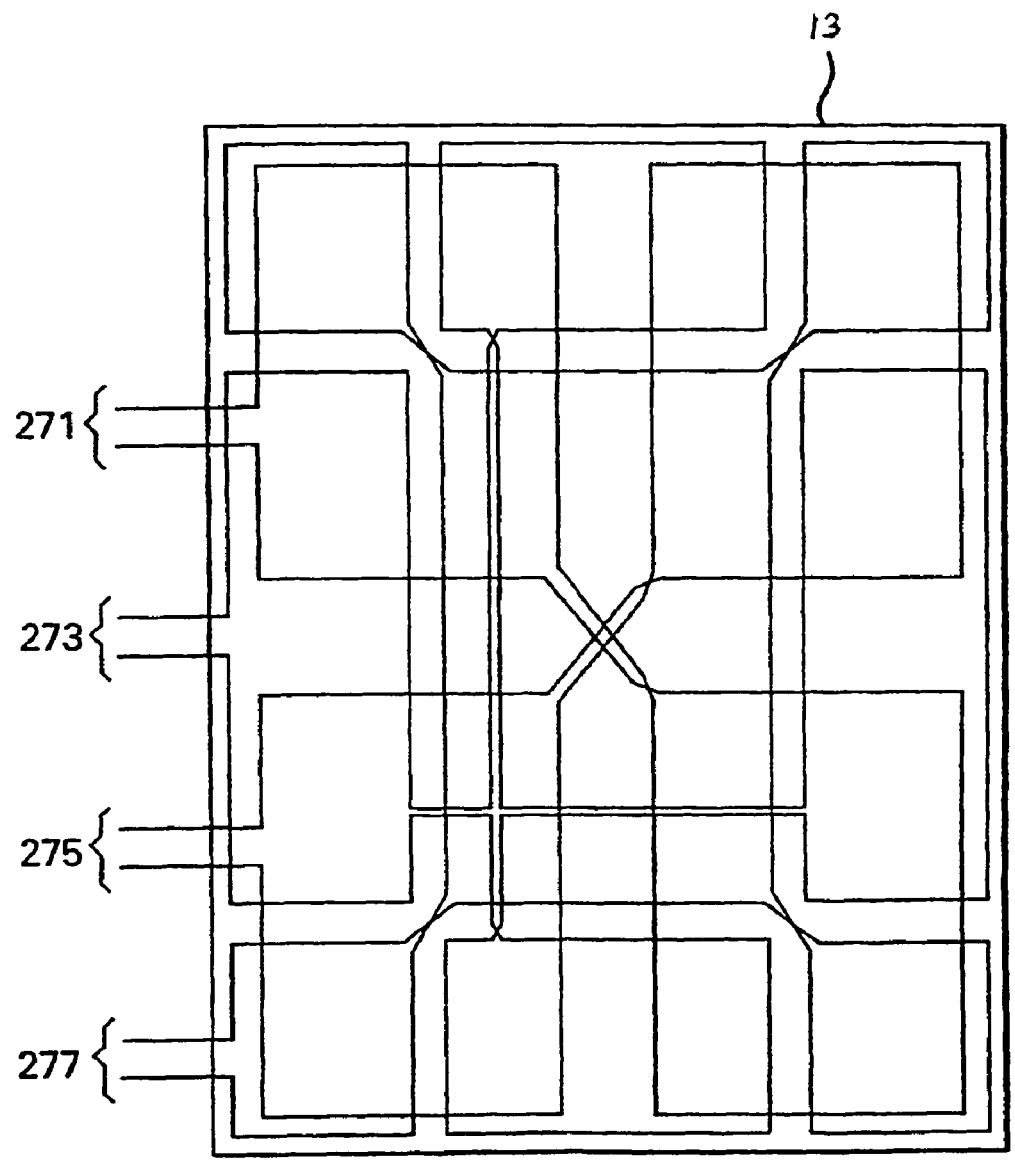
FIG. 11a schematically illustrates the form of a further alternative set of sensor windings which may be used instead of or in combination with the sensor windings shown in FIG. 7.
Figure 11B:
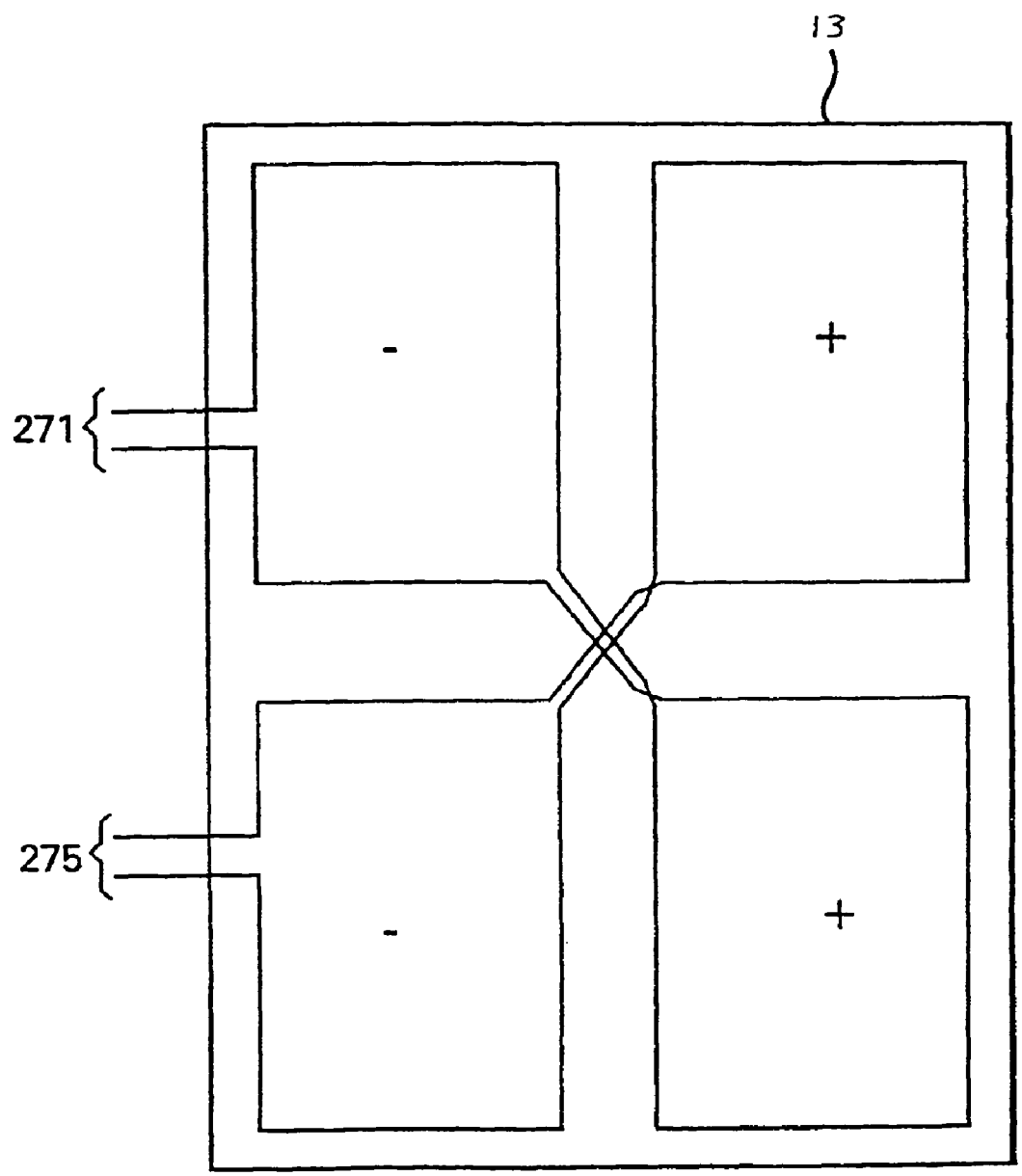
Figure 11C:
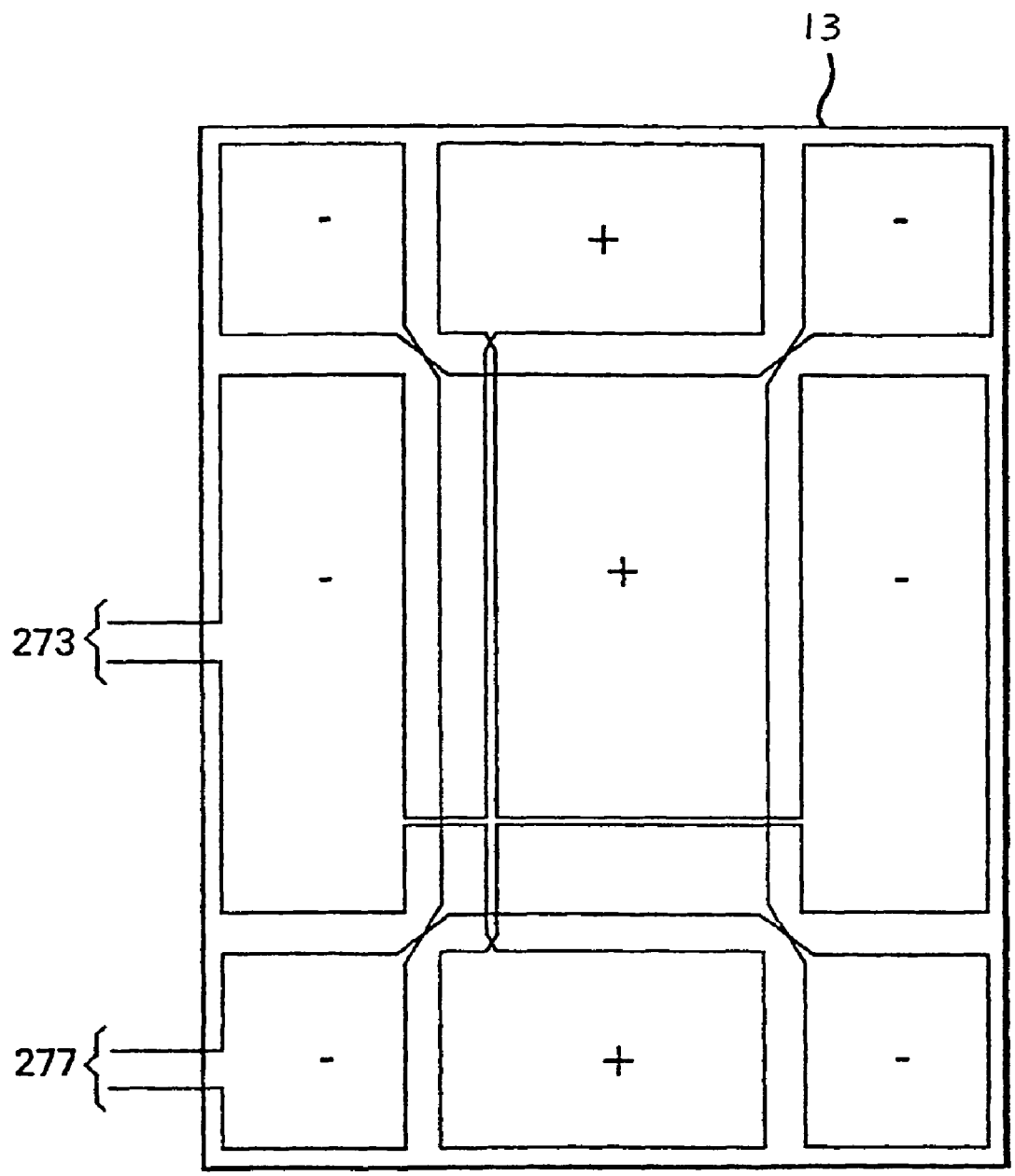

This problem with the conventional sensor winding layout shown in FIG. 10 can also be overcome by merging selected x and y sensor coils together and then recovering the information from the merged coils in the position processing electronics. FIG. 11*a* schematically illustrates a new set of sensor windings which may be used underneath the LCD 3 of the mobile telephone 1. As shown in FIG. 11*a*, four separate windings 271,273,275,277 are provided arrayed over the circuit board 13. However, as can be seen by comparing FIG. 11*a* with FIG. 10, only two conductors are required at the edges and corners of the circuit board FIG. 11*b* illustrates more clearly the form of the sensor windings 271 and 275 and FIG. 11*c* illustrates the form of the sensor windings 273 and 277. As can be seen from these Figures, each of the windings includes loops wound in opposite sense (as represented by the plus and minus symbols within each of the loops). Additionally, the loops of the windings are arranged in at least two rows and two columns on the circuit board 13 with loops in the same column having the same polarity and with adjacent loops in the same row having alternating polarities.

The processing electronics can then recover the signal which varies with sin x by adding the signal from sensor winding 271 to the signal from sensor winding 275. Similarly, the processing electronics can recover the signal which varies with sin y by subtracting the signal from sensor winding 271 from the signal from sensor winding 275. Similarly, the processing electronics can recover the cos x sensor signal by adding the signals received from sensor windings 273 and 277 and can recover the cos y sensor signal by subtracting the signal received from sensor winding 273 from the signal received from sensor winding 277.

As can be seen from FIG. 11, with the new layout of sensor windings, there are half as many sensing conductors at the corners than with the conventional layout illustrated in FIG. 10. This means that the exact location of each conductor track can be chosen more freely in order to optimise accuracy, or the number of turns for each sensor winding may be increased in order to improve the signal to noise ratio.

Modifications and Alternative Embodiments

The embodiment described above describes a mobile telephone having an x-y digitising system for sensing the position of a user controlled resonant stylus. A novel arrangement of the excitation winding used to energise the resonant stylus was described together with a novel arrangement of sensor windings formed on a flexible printed circuit board. A further novel set of sensor windings was also described which could be used in combination with the sensor windings on the folded circuit board. As those skilled in the art will appreciate, it is not essential to provide an x-y digitising system having all of these novel components. For example, the novel excitation windings may be used in combination with other types of sensor windings such as the loop coils described in U.S. Pat. No. 4,878,553. Similarly, the novel sensor windings may be used together with a conventional excitation winding whose magnetic axis is orthogonal to the plane of the x-y measurement area. Further still, the two novel sensor winding designs described above do not have to be used together; each may be used separately if desired.

In the above embodiment, the novel excitation coil was used to energise a resonant stylus which in turn re-radiated a signal for reception by the sensor windings. As those skilled in the art will appreciate, the excitation winding(s) described above may be used in other applications simply to power or to transfer information to a remote electromagnetic device which operates above the x-y working area. For example, the remote device may detect the EMFs induced in a coil thereof by the two excitation windings, and use the relative amplitudes of these EMFs to determine its position relative to the windings. This position information can then be stored or used by the device or relayed to another device through an appropriate transmission channel (RF, optic, acoustic etc). Further, if the remote electromagnetic device is to respond when energised, this may be limited to transmitting a status signal which is independent of the position of the remote device relative to the x-y working area. Further still, the same excitation winding may be used to both transmit signals to the remote electromagnetic device and to receive signals from the remote electromagnetic device.

In a similar manner, the novel sensing windings described above may be used in systems that do not require an excitation winding. For example, when a powered stylus is used (e.g. a battery powered stylus), there is no need for a separate excitation winding for energising the stylus. In such an embodiment and in the previous embodiments, the input impedance of the processing electronics may be made high so that very little current flows in the sensor windings and the electronics detect the voltages induced in the windings.

Additionally, as those skilled in the art will appreciate, because of the general reciprocal nature of electromagnetic coupling, it is possible to reverse the operation of the above described sensor and excitation windings. In particular, the resonator may be energised by applying excitation current to the above-described sensor windings and by sensing the signals induced in the above-described excitation windings.

In the above embodiment, the processing electronics controlled which of the two excitation windings were energised depending on the current position of the stylus. In an alternative embodiment, the processor may regularly switch power between the two excitation coils. If necessary, the stylus may include an energy reservoir so that if one of the excitation coils does not couple with the stylus the energy stored in the energy reservoir may be used to power the stylus for the period of time that the current is applied to that excitation coil. This approach may be used in conjunction with the technique described in the main embodiment, for example when the position of the stylus in unknown such as at the outset of position sensing.

In the main embodiment described above the excitation circuitry applied current to one of the two excitation windings. Alternatively, the excitation electronics may be arranged to apply current to both excitation windings simultaneously. In this case, however, the phase of the two excitation signals applied to the excitation windings will depend on the current position of the stylus (to account for the opposite winding directions of the two windings). In particular, if the stylus is to the left of the winding 29-a or to the right of winding 29-b then the two excitation signals should be 180° out of phase with each other, but when the stylus is located between the two windings, the two excitation signals should be in phase with each other. If the two excitation windings are moved closer to the edge of the circuit board, then the same phase of excitation current may be applied to the two windings.

In the above embodiments, the excitation windings were wound along the long dimension of the circuit board. Alternatively, the excitation windings may be wound around the shorter dimension of the circuit board. This has the benefit of shorter wire length and hence lower resistance. Losses in the excitation windings are therefore lower for a given current and hence strength of magnetic field. However, this magnetic filed exists over a smaller fraction of the circuit board than when the windings are wound along the longer dimension, and it may be necessary to increase the number of excitation windings to enable the whole working area to be covered for a given minimum level of power to be transferred to the resonator.

In the above embodiments, two excitation windings were wound around the circuit board. As those skilled in the art will appreciate, it is not essential to use two excitation windings. The number of excitation windings used is a compromise between, on the one side complexity of circuit board manufacture, complexity of drive electronics and complexity of processing algorithms and on the other side efficiency.

In the above embodiment, the excitation windings were wound around both the sensor printed circuit board and a layer of magnetic screening material laminated to the base of the circuit board. As those skilled in the art will appreciate, it is not essential to have such screening material laminated to the circuit board. Further, if screening material is provided, then the excitation windings may be wound around the screening material alone. The selection may be made depending on the ease of manufacture and any need to minimise coupling between the excitation windings and the sensor windings.

In embodiments where electronic components are provided under the excitation windings, a conductive screen and/or a magnetic screen may be provided between the excitation windings and these electronic components, in order to minimise interference between the two systems. A spacer may be required between these screens and the excitation winding in order to minimise any impact they may have on power efficiency.

In the above embodiment, the excitation winding was wound around the printed circuit board so that the magnetic axis of the excitation winding is substantially parallel to the plane of the circuit board. The same result can be achieved by laying the excitation windings as conductors on two printed circuit boards with the screening material laminated between the two circuit boards and in which the conductors are connected through the circuit boards and through the screening material where appropriate to form continuous loops whose axes lie parallel to the circuit boards.

In the above embodiment, the magnetic coupling between the excitation windings and the resonator varied with the position of the resonator along the x axis. It is therefore possible to provide a winding around the perimeter of the circuit board, to measure the resonator signal after it has been energised by each of the excitation windings in turn and to use these measured signals to determine a coarse measurement of the position of the stylus.

In the above embodiment, the excitation winding was accurately wound around the periphery of the circuit board by providing slots along the edge of the circuit board. Alternatively, the windings may be built separately, for example by winding self bonding wire onto a cylindrical former whose circumference matches the final length of winding required (twice the height dimension of the circuit board). The resulting self-bonding ribbon would then be flattened and then bonded to the circuit board in the appropriate position. Alternatively, the excitation windings may be formed by winding the wire directly onto the circuit board or the screen, by feeding wire onto the circuit board or screen as it is rotated about the x-axis. However, this technique suffers from poor wire position control as the wire is placed along each long edge.

Figure 12:
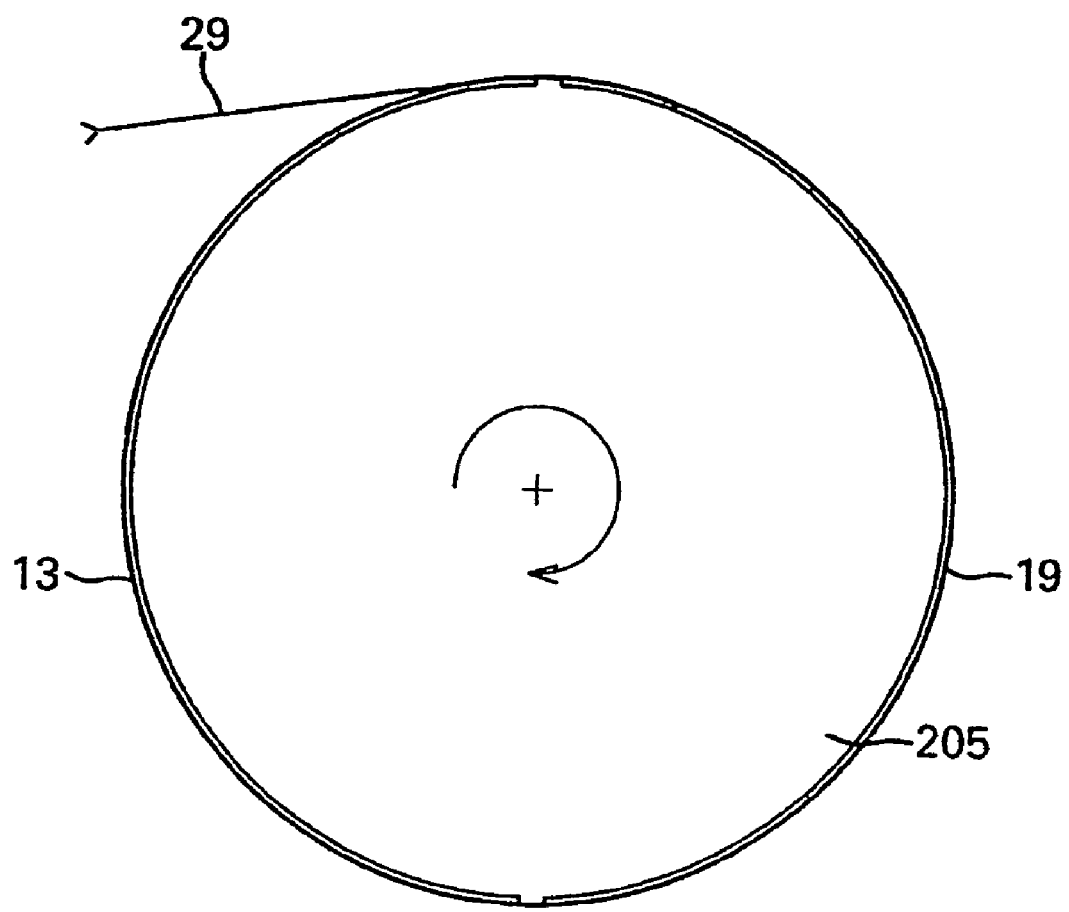
FIG. 12 schematically illustrates a rotatable drum on which the excitation coils can be wound onto the printed circuit board.

As a further alternative, and as shown in FIG. 12, the magnetic screen 19 and the printed circuit board 13 may be placed on opposite sides of a rotatable drum 205 and held in place with double-sided adhesive tape, which serves to fix the magnetic screen 19 and the circuit board 13 to the drum 205 and also acts to provide a winding surface for attaching a wire. The wire can then be fed under tension onto the drum in a conventional winding process. When complete, the coil ends are terminated to the printed circuit board 13 and the screen 19 and printed circuit board 13 are brought back flat, in contact with each other and then laminated with glue. Alternatively still, the system described with reference to FIG. 12 can be modified further to include only the magnetic screen 19 or only the circuit board 13. In this case, an additional material would have to be provided on the other side of the drum 205 which would be designed to release the adhesive tape on completion of the winding process.

Figure 13A:
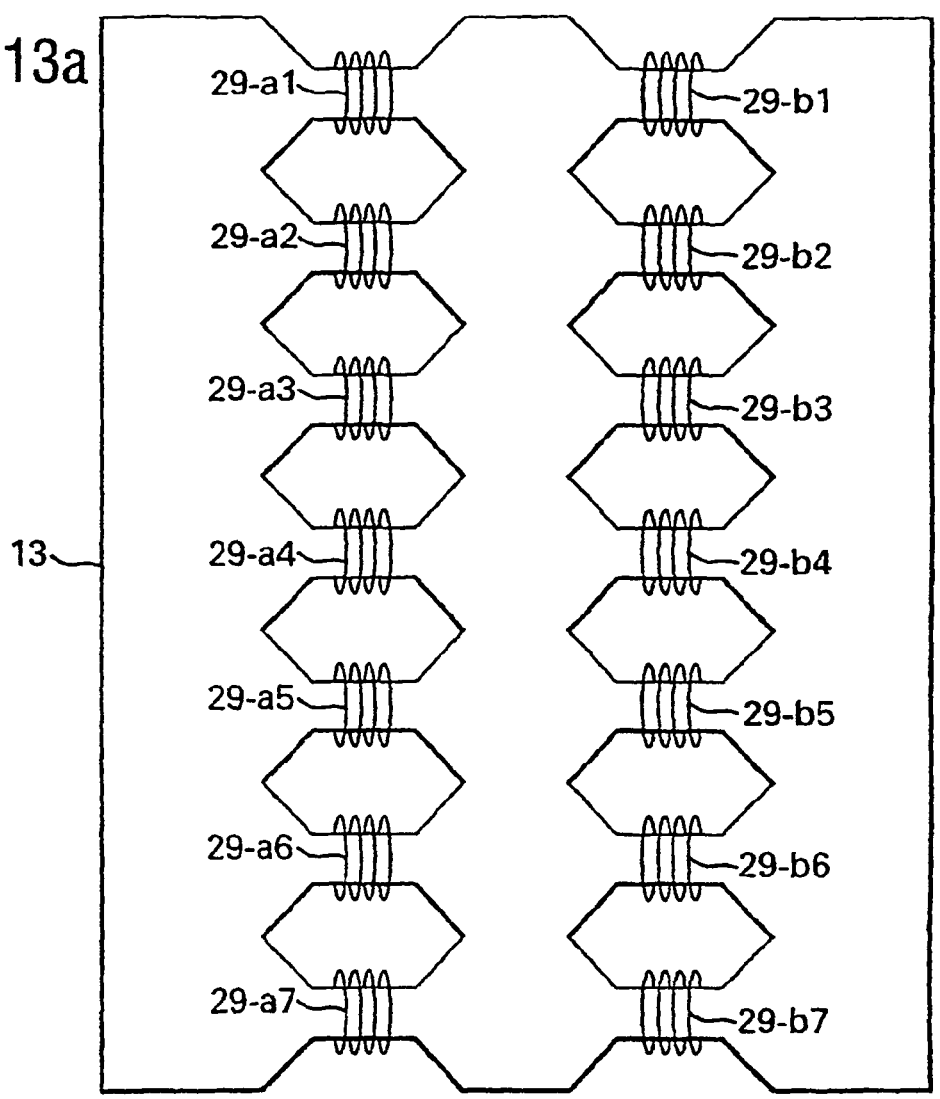
FIG. 13a schematically illustrates the form of an alternative set of excitation coils arrayed over a printed circuit board of an x-y digitising system.

In the above embodiment, the two excitation windings were wound along the entire length of the printed circuit board. As those skilled in the art will appreciate, this is not essential. FIG. 13a illustrates an embodiment where two sets of excitation windings are wound in two columns along the length of the circuit board 13. The windings of the first set 29-a1 to 29-a7 are provided in the first column and the windings in the second set 29-b1 to 29-b7 are provided in the second column. Each set of windings would then operate in a similar manner to the windings used in the first embodiment. In this alternative arrangement, the windings in each column may be connected in series or in parallel and each set offers the advantage of reduced wire length for a given magnetic field strength due to the concentrating effect of the magnetic material which improves the efficiency further. Additionally, the individual coils in each set may be powered individually so that only small sections of the sensing area are powered at any time, thereby further improving efficiency but at the expense of complexity. The choice of excitation coil would then be based on the current x and y positions. A coarse indication of y position may be obtained through interpolation of the signal strength detected from powering the coils in one of the columns. Additionally, the individual excitation windings shown in FIG. 13a may be implemented using planar self-bonded coil as used in RF-ID tags. In this case, the magnetic screen would have to be slit into overlapping parts to enable these discrete coils to be placed in position. The advantage of RF-ID tag coils is ease of manufacture and small thickness.

Figure 13B:
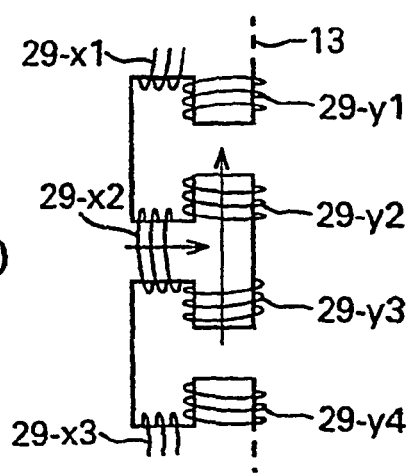
FIG. 13b shows a section of a printed circuit board illustrating a further alternative set of excitation windings wound on the printed circuit board with their axis in different directions but lying parallel to the plane of the circuit board.

As a further alternative, the edge of the circuit board 13 may be castellated in the manner illustrated in FIG. 13b, which allows the winding of coils 29-y1 to 29-y4 with axes extending in the y direction and coils 29-x1 to 29-x3 with axes extending in the x direction, which can lead to further improvements in efficiency. Further, since these coils are relatively small (compared to the dimensions of the circuit board), they may be better suited as sensor coils and will increase accuracy in position sensing.

Figure 14A:
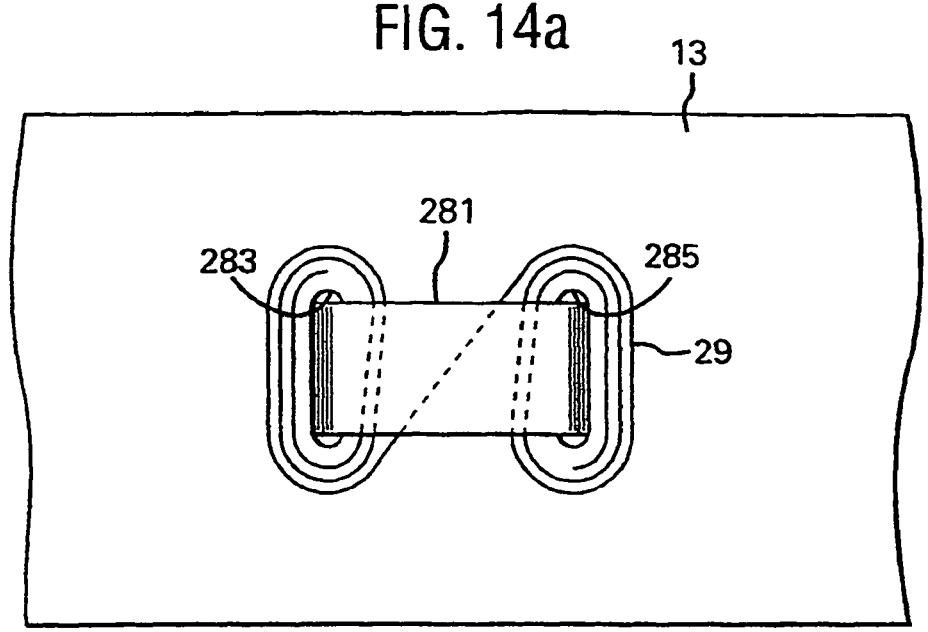
FIG. 14a schematically illustrates the form of a further alternative excitation winding arrangement formed by conductor tracks printed on the printed circuit board.
Figure 14B:
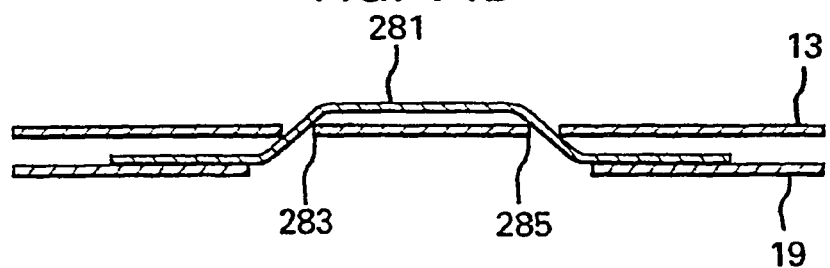
FIG. 14b illustrates the physical arrangement of the printed circuit board and a flexible piece of magnetically permeable material which passes through two slots in the printed circuit board around which the printed coils are wound.
Figure 14C:
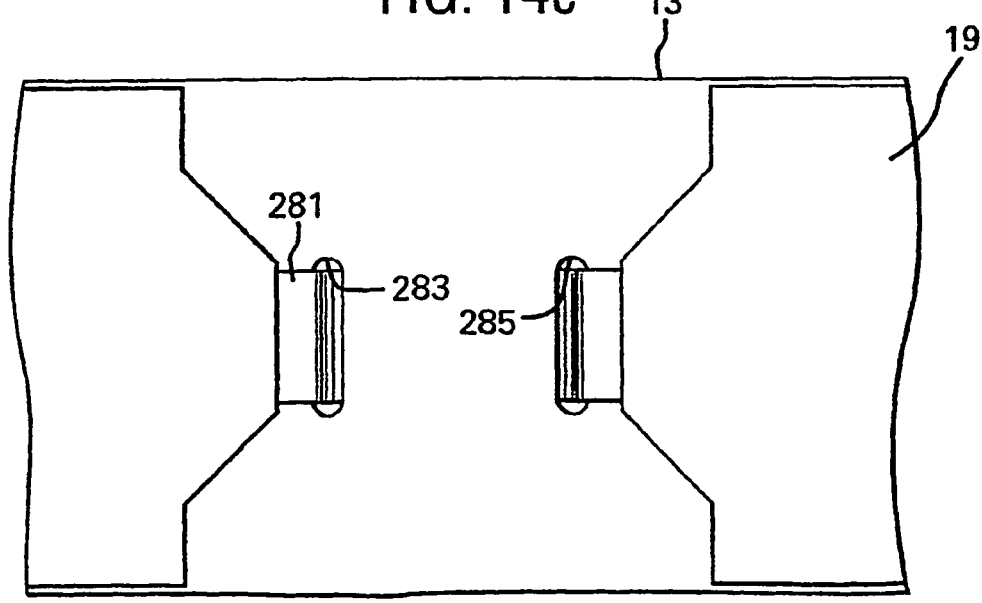
FIG. 14c schematically illustrates the arrangement shown in FIG. 14b viewed from beneath the printed circuit board.

In the above embodiment, the excitation winding used was wound in planes that were orthogonal to the plane of the printed circuit board. Alternatively, as illustrated in FIG. 14, the excitation winding may be formed by conductors printed in the plane of the circuit board. In this case, a small flexible bridge piece of permeable material 281 (made for example out of spin melt ribbon) would be passed through two slots 283 and 285 in the printed circuit board 13 which have the printed coils forming the excitation winding 29 wound round them. FIG. 14a is a planar view of such an embodiment and FIG. 14b is a cross sectional view showing how the flexible magnetic bridge 281 attaches to the shield material 19 underneath the circuit board 13 and passes through the slots 283 and 285. FIG. 14c is a view of the circuit board 13 from beneath the screening material 19. In this case, because of the flexible magnetic material 281, the effective magnetic axis of the excitation winding 29 is still substantially parallel to the plane of the printed circuit board 13.

In the above embodiment, the excitation windings described above were used in a mobile telephone device. As those skilled in the art will appreciate, the above novel windings may be used in other applications. For example, when the excitation windings are used with a tablet PC, the magnetic field which is emitted by the excitation windings can be used to inductively power a wireless mouse which operates to the side of the tablet PC, in addition to or instead of powering the stylus. Such an embodiment would be especially useful where a tablet PC is a convertible type where the mouse could be used in either mode of operation (as a mouse or a stylus). In such an embodiment, it may be necessary to wind at least one excitation coil perpendicular to the others in the plane of the circuit board, to enable the mouse to be powered in all positions around the perimeter of the tablet PC.

In an embodiment where the sensor windings mounted on the above described flexible printed circuit board are used with a conventional type of excitation winding (wound in the plane of the circuit board), this excitation winding may be mounted on a separate rigid printed circuit board also having a transparent window and then laminated on top of the central region 215 of the flexible circuit board. In this case, the combined circuit board may be manufactured by using a conventional rigid-flex manufacturing process. Additionally, where manually operable switches are also provided, the connection for these switches may also be mounted on the same circuit board in order to minimise the number of separate printed circuit boards and connections required. A grounded conductor layer may also be added to the top of the rigid circuit board carrying the excitation winding and the connection tracks for the switches. This layer can be slit so that a continuous loop does not exist around the display window which would otherwise act as a shorted turn for the excitation winding which would reduce efficiency due to eddy current losses in this conductive loop. A capacitor may also be connected across this slit so that it acts to suppress electromagnetic fields with much higher frequency than the excitation frequency used.

As a further alternative, the excitation winding may be wound as an insulated wire parallel to the plane of the LCD display around the folded portions of the flexible circuit board. This allows an increased volume of copper to be used thereby improving power efficiency and hence battery life.

In the above embodiment, the flexible circuit board was arranged to fit over the front of the display and fold down around its sides. As an alternative, the flexible circuit board may be arranged to fit over the rear of the display and fold up around its sides. In this case, the central region of the circuit board may not require a window and may be fitted with the additional sensor windings (such as those shown in FIGS. 10 and 11). In this case, the bent up sides of the flexible circuit board can include coils with axes parallel to the writing surface, again yielding improvements in accuracy and signal level near the circuit board corners.

As those skilled in the art will appreciate, the outline of the flexible printed circuit board shown in FIG. 7b can be replaced by another circuit board outline having other patterns of cuts and folds to surround the display as appropriate when folded.

In the above embodiments, the novel excitation and/or sensor windings were arranged so that their effective magnetic axes are substantially parallel to the plane of the LCD display. As those skilled in the art will appreciate, it is not essential for these axes to be exactly parallel with the plane of the LCD display. The axes preferably lie at an angle of between 0 and 5° to the plane of the LCD. Further, the inventor has found that improvements in efficiency are still achieved when the axes of the windings lies at an angle between 0 and 60° to the plane of the display.

In the embodiment described above, an excitation operation was performed followed by a detection operation. As those skilled in the art will appreciate, it is not essential for the detection operation to be performed after the excitation operation. For example, the detection operation may begin before the excitation operation has ended, although this is not preferred due to potential coupling between the excitation windings and the sensor windings, which may result in errors in the position measurements.

In the above embodiment, the system was operated in a pulse echo mode in which the excitation winding(s) is energised and then the signals in the sensor windings are processed. However, it is possible to operate the system in a continuous mode of operation (where at least one of the excitation windings is continuously energised) provided it is possible to distinguish the return signal from any excitation breakthrough. This will be the case if the stylus uses a resonator since the resonator signal will be electrically in phase quadrature with the breakthrough signal. This will also be the case with some other types of electromagnetic device, such as harmonic generators or electronic transponders that transmit at a different frequency to the excitation frequency or which radiates digitally coded signals etc.

Figure 15A:
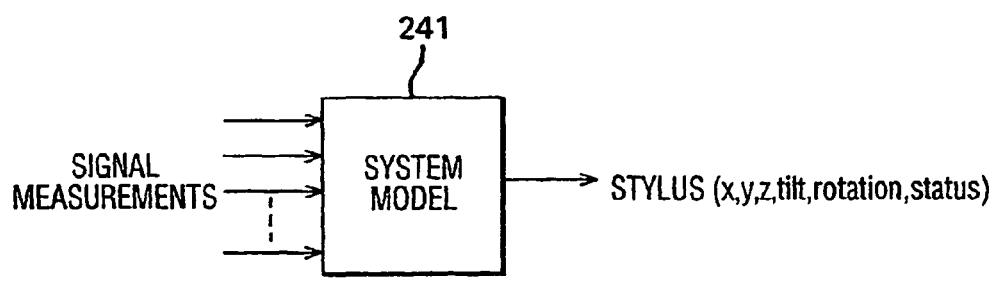
FIG. 15a is a block diagram illustrating a system model which is used to derive the position and status information of the resonant stylus from the signal measurements received from the sensor windings.
Figure 15B:
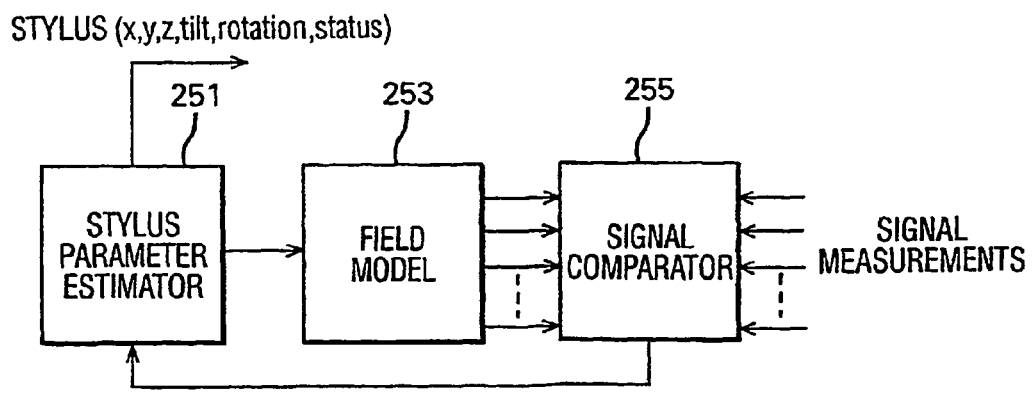

In the above embodiment, a particular arrangement of processing electronics is described. As those skilled in the art will appreciate, the signals generated in the sensor windings may be processed by any appropriate processing electronics which can derive the required information from the received signals. As illustrated in FIG. 15a, in the general case, the processing electronics will include a system model 241 which relates the way in which the received sensor signals varies with the parameters to be measured. In the particular embodiment discussed above, the parameters to be measured may include one or more of the x, y, z position of the stylus, the tilt of the stylus, the rotation of the stylus and the status of the stylus. In the embodiments described above, the system model 241 was effectively the sin and cos relationships defined in equations 1 to 8. As an alternative to applying the signal measurements to predetermined equations (and as illustrated in FIG. 15b), the processing electronics may include a field model 253 which models the field patterns which will be generated in the system for a given set of stylus parameters and uses these field patterns to predict the values of the signal measurements. The predicted values of the signal measurements are then compared with the actual signal measurements in a signal comparator 255 and the results used to update the estimation of the stylus parameters. This process is then repeated until the error between the predicted signal measurements and the actual signal measurements is minimised or reaches some convergence criteria.

In the main embodiment described above, the signals induced in the sensor windings were passed through respective processing channels comprising a mixer and an integrator. As those skilled in the art will appreciate, the mixing and integration process may be performed in the digital electronics, with the raw sensor signals being fed directly into the analogue-to-digital converter. However, such an embodiment requires more complex digital electronics. Additionally, the signals from the different sensor windings may be time-multiplexed through the same processing channel in order to reduce the number of system components.

In the above embodiment, the resonant stylus included a passive resonant circuit. As those skilled in the art will appreciate, different types of stylus may be provided for interacting with the sensor and/or excitation windings. For example, the resonant stylus may be replaced by a short circuit coil, a piece of ferrite, a mechanically resonant device such as a magnetostrictive element, a conductive screen etc. It is also possible to include electronics within the stylus, with the magnetic field generated by the excitation winding being used to power the electronics in the stylus. Multiple resonators could also be used in the stylus which can provide more information about the status of the stylus.

In the above embodiment, the stylus was arranged so that the resonant frequency of the stylus changed with pressure applied to the tip. In an alternative embodiment, one or more switches may be provided on the stylus which may be actuated by a user in order to change the resonant frequency of the stylus. This can then be detected by the processing electronics in order to exchange status information between the stylus and the processing electronics.

In the above embodiment, the excitation and processing circuitry was formed in the same device as the excitation and sensor windings. As those skilled in the art will appreciate, the excitation and processing circuitry may be provided on a remote body from the sensor windings. All that is required is that the resonant stylus be energised by an appropriate energising field and for the signals received in the sensor windings to be transmitted to the processing circuitry.

In the above embodiment, a single stylus was provided. As those skilled in the art will appreciate, the system may operate with multiple styluses each having their own characteristic (e.g. resonant frequency) so that the system can differentiate the styluses being used. Each stylus may then be assigned a different function in the system.

In the above embodiments, the windings were arranged over a generally rectangular measurement area corresponding to the x-y display. As those skilled in the art will appreciate, this is not essential. The sensor windings and the excitation windings may be arranged over non-rectangular areas.

In the above embodiment, each of the sensor windings was formed using multiple turns of conductor. As those skilled in the art will appreciate, the sensor windings can be formed using a single turn of conductor. However, this is not preferred since the sensor winding's sensitivity to the magnetic field generated by the resonator is less sinusoidal and the signal levels output are smaller. It is therefore preferred to have as many turns as possible in the sensor windings.

In the above embodiments, the stylus was inductively coupled to both the excitation windings and the sensor windings. As those skilled in the art will appreciate, it is not essential to have inductive coupling between both the stylus and the excitation windings and the stylus and the sensor windings. For example, the stylus may be inductively coupled to the excitation winding and capacitively or electrostatically coupled to the sensor windings or vice versa. Alternatively, the stylus may be arranged to transmit a RF signal to an appropriate receiver once powered.

The invention claimed is:

1. An x-y position sensor comprising:
first and second members which are relatively movable over an x-y planar working area;
the first member comprising a circuit board that lies in an x-y plane that is substantially parallel to said planar working area, the circuit board carrying a plurality of conductor tracks that define one or more coils that lie in said x-y plane;
the first member further comprising a coil that lies in at least one plane that is inclined to the x-y plane of said circuit board; and
the second member comprising an electromagnetic device operable to electromagnetically couple with said one or more coils that lie in said x-y plane of the circuit board and to electromagnetically couple with said coil that lies in at least one plane that is inclined to the x-y plane of the circuit board, to generate sensor signals that vary with the relative position of the first and second members.

2. An apparatus according to claim 1, wherein said first member further comprises a drive circuit operable to apply a drive signal to said coil that lies in at least one plane that is inclined to the x-y plane of the circuit board to create a magnetic field over said x-y planar working area, and wherein said electromagnetic device of said second member is operable to be energized by said magnetic field.

3. An apparatus according to claim 2, wherein said electromagnetic device comprises a coil which is operable to couple with said magnetic field to energize said electromagnetic device.

4. An apparatus according to claim 2, wherein said electromagnetic device comprises a resonator.

5. An apparatus according to claim 1, wherein said electromagnetic device is operable to generate an electromagnetic field which electromagnetically couples with said coil that lies in at least one plane that is inclined to the x-y plane of the circuit board to generate said one or more sensor signals, and wherein said first member further comprises a processor operable to process said one or more sensor signals.

6. An apparatus according to claim 1, wherein said one or more sensor signals vary with the status of said electromagnetic device, and wherein said processor is operable to process said one or more sensor signals to determine the current status of the electromagnetic device.

7. An apparatus according to claim 6, wherein said status comprises the current position of the second member relative to the first member, and wherein said processor is operable to process said one or more sensor signals to determine the current position of said second member relative to said first member.

8. An apparatus according to claim 1, wherein said one or more sensor signals are generated in said coil that lies in at least one plane that is inclined to the x-y plane of the circuit board.

9. An apparatus according to claim 1, wherein said one or more sensor signals are generated in said one or more coils that lie in said x-y plane of the circuit board.

10. An apparatus according to claim 9, wherein said circuit board comprises foldable portions which, in use, lie at an angle to said x-y plane and comprise conductor tracks that define at least one coil having one or more loops that are formed on at least one of said foldable portions.

11. An apparatus according to claim 10, wherein said foldable portions are at an edge of said circuit board.

12. An apparatus according to claim 10, wherein said circuit board comprises a transparent window.

13. An apparatus according to claim 12, wherein said first member comprises a display, and wherein said circuit board is arranged to fit over or under said display, and wherein said foldable portions fold along the sides of the display.

14. An apparatus according to claim 1, wherein said first member comprises a plurality of coils that lie in planes that are inclined to the x-y plane of said circuit board.

15. An apparatus according to claim 1, wherein the coil that lies in at least one plane that is inclined to the x-y plane of the circuit board lies in at least one plane that is inclined to said x-y circuit board by an angle of between 30° and 90°.

16. An apparatus according to claim 1, wherein the coil that lies in at least one plane that is inclined to the x-y plane of the circuit board lies in a plane that is inclined by an angle of substantially 90° to the x-y circuit board.

17. An apparatus according to claim 1, wherein said at least one coil that lies in at least one plane that is inclined to the x-y plane of the circuit board is formed adjacent a peripheral portion of said planar working area.

18. An apparatus according to claim 1, wherein said at least one coil that lies in at least one plane that is inclined to the x-y plane of the circuit board is arranged to have a sensitivity function to magnetic field which spatially varies approximately sinusoidally across at least one dimension of said planar working area.

19. An apparatus according to claim 1, wherein said coil that lies in at least one plane that is inclined to the x-y plane of the circuit board comprises first and second coil portions which are located on opposite edges of the planar working area and which are connected in series to have a sensitivity function which spatially varies approximately sinusoidally across the planar working area.

20. An apparatus according to claim 1, wherein said at least one coil that lies in at least one plane that is inclined to the x-y plane of the circuit board is wound with a conductive winding passing around at least a part of said x-y circuit board so that the coil lies in at least one plane that is substantially perpendicular to said x-y circuit board.

21. A method of transferring signals comprising the step of using an apparatus according to claim 1.

22. An x-y position sensor signal transferring apparatus comprising:
  first and second members which are relatively movable over a planar working area;
  the first member comprising a circuit board that lies in an x-y plane that is substantially parallel to said planar working area, the circuit board carrying a plurality of conductor tracks that define one or more coils that lie in said x-y plane; and
  the second member comprising an electromagnetic device operable to electromagnetically couple with said one or more coils that lie in said x-y plane of the circuit board to generate sensor signals that vary with the relative position of the first and second members and to electromagnetically couple with a coil that lies in at least one plane that is inclined to the x-y plane of said circuit board;
  wherein said first member comprises a layer of high magnetic permeability material arranged substantially parallel to said x-y planar working area, and
  wherein a portion of the magnetic material extends through a core of at least one of said coils so that, electromagnetically, the coil emulates a coil that lies in at least one plane that is inclined to the x-y plane of said circuit board.

23. A portable computing device comprising:
  a planar display;
  an x-y digitizer associated with the display and operable to sense the status of an indicator which is moveable relative to the display; and
  a processor operable to control the display in accordance with the sensed status of said moveable indicator; and
  wherein said x-y digitizer comprises a circuit board that lies in an x-y plane that is substantially parallel to said planar display, the circuit board carrying a plurality of conductor tracks that define one or more coils that lie in said x-y plane; and the x-y digitizer further comprising a coil that lies in at least one plane that is inclined to the x-y plane of said circuit board;
  wherein said the one or more coils that lie in said x-y plane of the circuit board and said coil that lies in at least one plane that is inclined to the x-y plane of the circuit board are arranged to electromagnetically couple with said indicator, to generate sensor signals that vary with the relative position of the first and second members.

24. A circuit board for use in an x-y position sensor, the circuit board comprising:
  a central portion having one or more conductor loops and a flexible peripheral portion which has at least one conductor loop that is electrically separate from the one or more conductor loops on the central portion, wherein the flexible peripheral portion can flex relative to said central portion wherein the conductor loops are arranged on said circuit board for use in sensing x-y positions and wherein an area enclosed by said at least one loop on said flexible peripheral portion does not include said central portion.

25. A circuit board according to claim 24, wherein said central portion includes a transparent window, and wherein said conductor loops of said central portion are formed at at least one edge of said transparent window.

26. A circuit board according to claim 25, adapted to fit over a display, with the display being viewable through said transparent window and said flexible portion being arranged to fit over the sides of said display.

27. An x-y position sensor comprising:
first and second members which are relatively movable over an x-y planar working area;
the first member comprising a circuit board arranged substantially parallel to said planar working area and carrying a plurality of separate windings, including at least one winding arranged in an x direction and at least one winding arranged in a y direction;
the second member comprising an electromagnetic device operable to interact with said windings to generate signals that vary with the relative x-y position of the first and second members; and
wherein said plurality of windings are arranged on a peripheral edge of said circuit board and wherein a central majority portion of said circuit board is free of any windings.

28. A sensor according to claim 27, wherein said central portion of said circuit board includes a transparent window.

29. A portable computing device comprising:
a planar display;
an x-y digitizer associated with the display and operable to sense the status of an indicator which is movable relative to the display; and
a processor operable to control the display in accordance with the sensed status of said movable indicator;
wherein said x-y digitizer comprises a circuit board that lies in an x-y plane that is substantially parallel to the plane of said display, the circuit board carrying conductor tracks defining x and y sensor coils; and
wherein the x-y digitizer further comprises at least one electromagnetic winding that lies in at least one plane that is inclined to the x-y plane of said circuit board, the winding for electromagnetic coupling with said indicator and being operable to power said indicator when operating above the display and when operating to a side of the portable computing device.

30. A device according to claim 29, wherein said indicator has a first mode of operation in which the indicator interacts with said x-y digitizer and a second mode of operation in which it acts as a conventional mouse and is powered by said at least one winding of said x-y digitizer.

* * * * *